US012782507B2

(12) United States Patent
Moltrecht

(10) Patent No.: US 12,782,507 B2
(45) Date of Patent: Nov. 3, 2026

(54) MACHINE PERCEPTION

(71) Applicant: NVIDIA Corporation, Santa Clara, CA (US)

(72) Inventor: Lennart Moltrecht, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 118 days.

(21) Appl. No.: 18/679,885

(22) Filed: May 31, 2024

(65) Prior Publication Data

US 2025/0370095 A1 Dec. 4, 2025

(51) Int. Cl.

*G01S 7/40* (2006.01)
*G01S 13/44* (2006.01)

(52) U.S. Cl.

CPC ............ *G01S 7/40* (2013.01); *G01S 13/4418* (2013.01)

(58) Field of Classification Search

CPC .... G01S 13/42; G01S 13/4418; G01S 13/582; G01S 13/865; G01S 13/867; G01S 13/931; G01S 2013/9318; G01S 2013/93185; G01S 2013/9319; G01S 2013/93271; G01S 2013/93272; G01S 2013/93274; G01S 7/40; G01S 7/403; G01S 7/4091

See application file for complete search history.

(56) References Cited

U.S. PATENT DOCUMENTS

| | | | | |
|---|---|---|---|---|
| 7,443,335 | B2 * | 10/2008 | Kai | G01S 13/931 342/147 |
| 10,545,221 | B2 * | 1/2020 | Fetterman | G01S 7/4026 |
| 10,885,698 | B2 | 1/2021 | Muthler et al. | |
| 11,144,754 | B2 | 10/2021 | Hu et al. | |

(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, Sep. 30, 2016, pp. 1-30.

(Continued)

*Primary Examiner* — Peter M Bythrow

(74) *Attorney, Agent, or Firm* — Shook, Hardy & Bacon L.L.P.

(57) ABSTRACT

In various example, embodiments are directed to angle bias error identification and correction for autonomous and semi-autonomous systems and applications. Systems and methods are disclosed that identify angle bias error(s) associated with detected sensor data and correct for such angle bias error(s) for use in localization, navigation, and/or other uses by autonomous vehicles, semi-autonomous vehicles, robots, and/or other object or machine types. In embodiments, angle bias error identification is performed by detecting angle error in association with various points detected via a sensor during normal driving operation of an ego-machine. The detected angle errors may be used to generate a represen- (Continued)

tation of angle bias error for various angles of the sensor, which may be used to apply a correction to raw angle measurements. Using techniques described herein, for example, corrected azimuth angle measurements may be generated for use by downstream modules to perform more efficient and effective navigation.

20 Claims, 15 Drawing Sheets

(56) References Cited

U.S. PATENT DOCUMENTS

| | | | | |
|---|---|---|---|---|
| 11,238,615 | B2 * | 2/2022 | Kroeger | G06T 7/80 |
| 11,619,707 | B1 * | 4/2023 | Statnikov | G01S 7/40 342/174 |
| 11,644,834 | B2 | 5/2023 | Ditty et al. | |
| 12,153,158 | B2 * | 11/2024 | Statnikov | G01S 13/52 |
| 2007/0115169 | A1 * | 5/2007 | Kai | G01S 13/931 342/174 |
| 2011/0153268 | A1 * | 6/2011 | Jordan | G01S 7/52004 702/151 |
| 2012/0242531 | A1 * | 9/2012 | Itoh | G01S 7/4056 342/107 |
| 2015/0070207 | A1 * | 3/2015 | Millar | G01S 13/4454 342/174 |
| 2018/0113195 | A1 * | 4/2018 | Bialer | G01S 13/86 |
| 2018/0120414 | A1 * | 5/2018 | Alcalde | G01S 7/4004 |
| 2018/0120417 | A1 * | 5/2018 | Matsunaga | B60T 7/22 |
| 2019/0025405 | A1 * | 1/2019 | Liu | G01S 7/4026 |
| 2019/0293756 | A1 * | 9/2019 | Blaes | G01S 7/4026 |
| 2020/0033444 | A1 * | 1/2020 | Marsch | G01S 13/931 |
| 2020/0209354 | A1 * | 7/2020 | Sumin | G01S 13/50 |
| 2020/0309937 | A1 * | 10/2020 | Buddendick | G01S 7/4026 |
| 2020/0357140 | A1 * | 11/2020 | Kroeger | G06T 7/85 |
| 2020/0363501 | A1 * | 11/2020 | Lau | G01S 15/931 |
| 2021/0055380 | A1 * | 2/2021 | Blaes | G01S 7/4026 |
| 2021/0063560 | A1 * | 3/2021 | Bosse | G01S 13/93 |
| 2021/0341599 | A1 * | 11/2021 | Rozewicz | G01S 13/931 |
| 2022/0065987 | A1 * | 3/2022 | Kondo | G01S 13/931 |
| 2022/0196798 | A1 * | 6/2022 | Chen | G01S 7/354 |
| 2022/0252719 | A1 * | 8/2022 | Onozawa | G01S 13/34 |
| 2022/0268887 | A1 * | 8/2022 | van Meurs | G01S 7/4026 |
| 2022/0350018 | A1 * | 11/2022 | Alferdaous Alazem | G01S 17/95 |
| 2022/0365193 | A1 * | 11/2022 | Wetoschkin | G01S 13/931 |
| 2023/0082823 | A1 * | 3/2023 | Sato | G01S 7/4026 342/107 |
| 2025/0028041 | A1 * | 1/2025 | Meyer | G01S 13/42 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, Jun. 15, 2018, pp. 1-35.

Bobaru et al., "A Method for Automatic Radar Azimuth Calibration using Stationary Targets", 2021 IEEE 17th International Conference on Intelligent Computer Communication and Processing (ICCP), Oct. 2021, 6 pages.

IEC 61508, "Functional Safety of Electrical/Electronic/Programmable Electronic Safety-related Systems", Retrieved from Internet URL: <https://en.wikipedia.org/wiki/IEC_61508>, Accessed on Apr. 1, 2022, 7 pages.

ISO 26262, "Road vehicle—Functional safety", International standard for functional safety of electronic system, Retrieved from Internet URL: <https://en.wikipedia.org/wiki/ISO_26262>, Accessed on Sep. 13, 2021, 8 pages.

Suzuki et al., "Bias Angle Error Self-Correction for Automotive Applications Using Phased Array Radars Installed Behind Bumpers", 2017 IEEE MTT-S International Conference on Microwaves for Intelligent Mobility (ICMIM), Mar. 2017, pp. 155-158.

* cited by examiner

MACHINE PERCEPTION

BACKGROUND

Designing a system to safely drive a vehicle autonomously without supervision or semi-autonomously with limited supervision is tremendously difficult. For example, some designs seek to have an autonomous vehicle or other ego-machine be capable of performing as a functional equivalent of an attentive driver—who draws upon a perception and action system that has an incredible ability to identify and react to dynamic and static obstacles in a complex environment—to avoid other objects or structures along the path of the vehicle. In designing such a system, determining accurate measurements is invaluable to accurate object perception, localization, speed, etc.

RADAR sensors may be used, for example, to obtain sensor data that facilitates localization (e.g., positioning an ego-machine in a map), path planning (e.g., determining candidate routes for an ego-machine), object detection and tracking (e.g., for performing object in path analysis), and/or decision making (e.g. determining an optimal route based on the candidate paths, vehicle state, and environment). For example, a RADAR sensor(s) may be positioned on an ego-machine to emit radio waves (e.g., via a transmitter antenna) and receive reflected signals (e.g., via receiver antenna) to detect various types of sensor data or measurements (e.g., distance, angle, velocity, etc.) associated with a detected object(s) in the environment. Such sensor data detected or generated via a RADAR sensor(s) may be used in object detection or positioning to make decisions about route planning, collision avoidance, speed estimation, etc. In this regard, accurate sensor data detected via a RADAR sensor(s) is valuable for effectively facilitating localization, path planning, and/or decision making in the context of autonomous vehicles, thereby contributing to a safer and more efficient transportation system.

In some cases, however, sensor data detected by a RADAR may not be accurate, thereby impacting the effectiveness of the sensor data (e.g., for use in performing accurate object perception). For example, a RADAR sensor positioned on an ego-machine may be obstructed such that sensor data is not accurately detected. For instance, for an aesthetic design reason, a RADAR sensor positioned on a vehicle may be covered (e.g., via a radome), which may result in distortions of radar beams (e.g., due to a metallic component) and, as such, inaccurate sensor data. As another example, a RADAR sensor and/or radome may deform (e.g., due to environmental factors), resulting in RADAR beam distortions. Such distortions may result in systematic errors or deviations in various measurements, such as angles associated with detected objects. In this way, sensor data, such as angles, detected in association with a RADAR sensor may be inaccurate or erroneous, resulting in suboptimal object perception, among other things. Accordingly, navigation planning and decision-making using such biased sensor data may result in inaccurate information, thereby limiting the ability to effectively navigate an autonomous vehicle through an environment.

To identify error of angles, one conventional approach uses a reference geometry, such as a straight highway guard rail, and specific driving maneuvers (e.g., straight driving with constant offset from the reference geometry). Another conventional approach uses specific driving maneuverers (e.g., straight driving) and Monte-Carlo-sampling. These approaches, however, require additional implementation limitations that may be burdensome. Further, such implementations may result in a more computationally expensive process, for example, to accommodate precise geometric calculations, continuous adjustment of driving maneuvers, and/or iterative sampling processes. As such, conventional approaches to identifying angle errors have limited functionality and accuracy, thereby limiting the ability to effectively navigate an ego-machine through an environment.

SUMMARY

Embodiments of the present disclosure relate to angle bias error identification and correction for autonomous and semi-autonomous systems and applications. Systems and methods are disclosed that identify angle bias error(s) associated with sensor data detected via a sensor (e.g., RADAR sensor) and correct for such angle bias error(s) for use in localization, navigation, and/or other uses by autonomous vehicles, semi-autonomous vehicles, robots, and/or other object or machine types.

In contrast to conventional systems, in some embodiments, angle bias error identification is performed by detecting angle error in association with various points detected via a sensor (e.g., RADAR sensor) during normal driving operation of an ego-machine. The detected angle errors may be used to generate a representation of angle bias error for various angles of the sensor, which may be used to apply a correction to raw angle measurements (e.g., azimuth angle measurements). Such corrected angles may be used for navigation planning and decision making, among other things, in autonomous or semi-autonomous systems and applications. For example, using techniques provided herein, corrected azimuth angle measurements having lower noise and higher accuracy may be generated for use by downstream modules to perform more efficient and effective navigation, thereby providing a safer operation of the ego-machine. Unlike conventional approaches, various embodiments provide a way to enable accurate and efficient identification of accurate angle data that may be acted upon, thereby allowing for more precise navigation instructions than in conventional methods. For example, embodiments enable identification of accurate angle data without requiring specific reference geometry (e.g., straight highway guard rail) and/or specific driving maneuvers (e.g., straight driving). As such, embodiments described herein enable a more adaptable approach. Further, various embodiments may be more efficiently performed as identification of specific reference geometry and/or driving maneuvers is unnecessary.

BRIEF DESCRIPTION OF THE DRAWINGS

The present systems and methods for angle bias error identification and correction for autonomous and semi-autonomous systems and applications are described in detail below with reference to the attached drawing figures, wherein.

DETAILED DESCRIPTION

Figure 1:
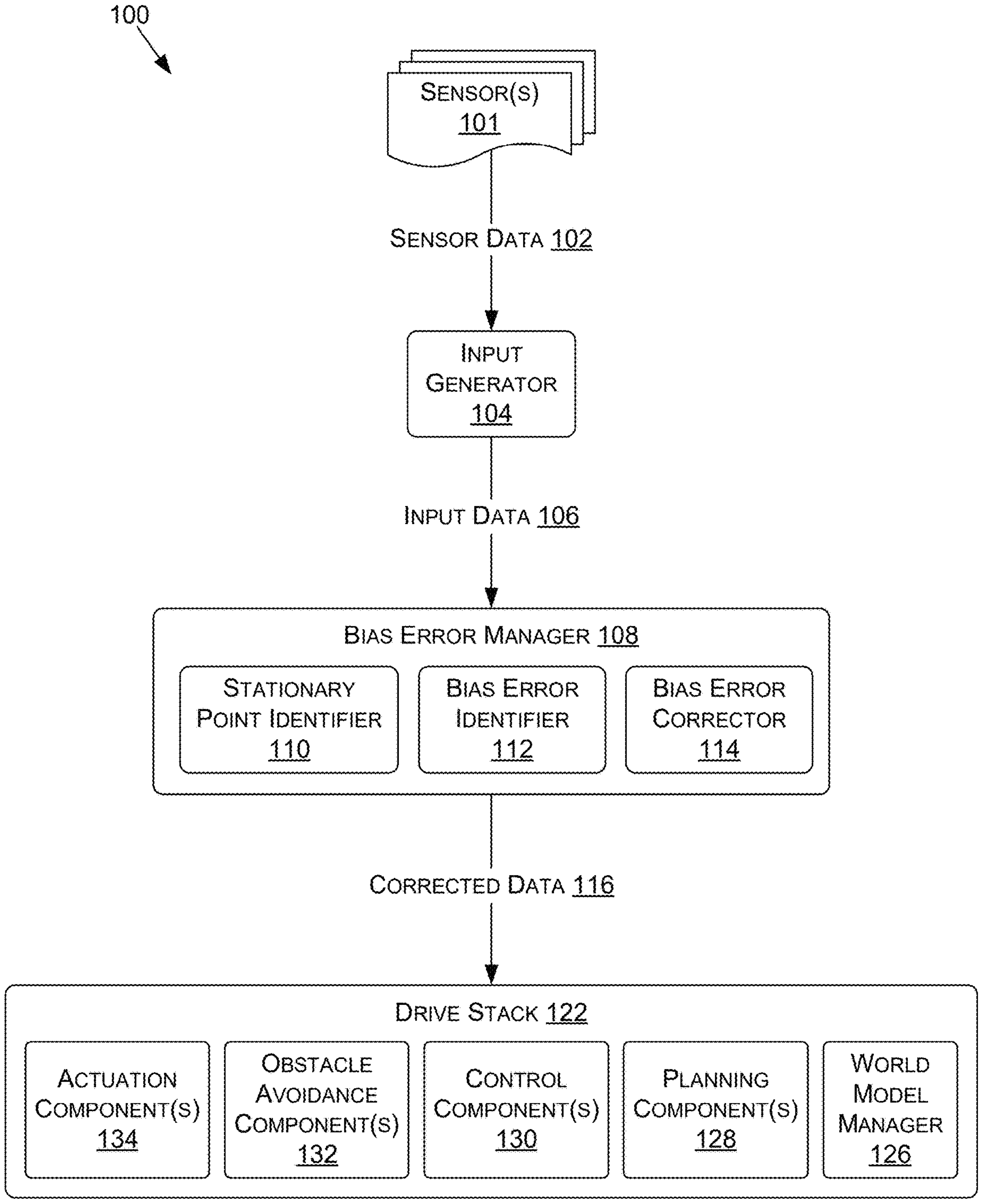
FIG. 1 is a data flow diagram illustrating an example process for a bias error identification and correction system, in accordance with some embodiments of the present disclosure.

Systems and methods are disclosed related to angle bias error identification and correction for autonomous and semi-autonomous systems and applications. For example, systems and methods are disclosed that identify angle bias error(s) associated with sensor data detected via a RADAR sensor(s) and correct for such bias error(s). In this regard, the present techniques result in more accurate sensor data, and in particular angle data, thereby enabling more accurate and effective use of such data, including for use in performing localization, navigation, and/or other uses by autonomous vehicles, semi-autonomous vehicles, robots, and/or other object or machine types.

Although the present disclosure may be described with respect to an example autonomous or semi-autonomous vehicle or machine 1000 (alternatively referred to herein as "vehicle 1000," "ego-vehicle 1000," "machine 1000," or "ego-machine 1000," an example of which is described with respect to FIGS. 10A-10D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to angle bias error in association with autonomous or semi-autonomous systems and applications, this is not intended to be limiting. Instead, the systems and methods described herein may be used in augmented reality, virtual reality, mixed reality, robotics, security and surveillance, autonomous or semi-autonomous machine applications, and/or any other technology spaces where object perception, localization, and/or navigation may be used. Alternatively or additionally, the systems and methods described herein may be used to identify and/or correct for other types of bias errors detected in association with autonomous or semi-autonomous systems and applications. For example, other errors occurring in data detected by a RADAR sensor or other sensor modality (e.g., LiDAR, ultrasonic, etc.) may be identified and/or corrected in a manner as described herein.

At a high level, embodiments described herein are directed to angle bias error identification and correction for autonomous and semi-autonomous systems and applications. In particular, angle errors associated with angles detected via a sensor may be identified based on sensor data detected in association with a three dimensional (3D) environment of an ego-machine. For various angles within the field of view of a sensor, data distributions may be generated using the angle errors associated with the corresponding angle to identify an angle bias error for the angle. For example, an angle bias error associated with an angle of zero degrees may be a mean of a data distribution of the angle errors corresponding with the angle of zero degrees. As the distortions generated by the sensor may vary across the field of view, the angle bias error may also vary across the field of view. In accordance with identifying angle bias error, the angle bias error may be used to correct for sensor data, for example, subsequently collected by the sensor. By way of example only, for a particular sensor, assume an angle bias error of 0.5 degrees is identified at 30 degrees. In such a case, based on a new data point being detected as having an angle of 30 degrees, the angle may be corrected to be 29.5 degrees, thereby reducing systematic error detected in association with the particular sensor (e.g., based on distorted RADAR beams).

In operation, sensor data is collected by a sensor(s), such as a RADAR sensor, located or positioned in association with an ego-machine (e.g., mounted to an exterior of an ego-machine). For example, a RADAR sensor may emit electromagnetic waves and detect their reflections off of objects in the environment to determine various sensor data, such as angle, distance, velocity, Doppler effect, Doppler velocity, etc. Accordingly, the sensors may obtain sensor data representing the environment surrounding or around the ego-vehicle, such as detections from guard rails along the highway, pedestrians, bicycles, traffic lights, etc.

In embodiments, a sensor data representation, or a representation of points, in the form of a point cloud may be generated. A point cloud may be a collection of points in a three-dimensional coordinate system, with each point representing a specific location and other attributes associated with the object or surface detected by a sensor. For example, each point in the point cloud may correspond to a set of coordinates in the x, y, and/or z axes, along with attributes including angle data, distance data, velocity data, Doppler velocity data, etc.

In accordance with generating a representation of points (e.g., a RADAR point cloud), sensor data associated therewith may be used to identify angle errors associated with various angles of the sensor. An angle error may refer to an error of an angle (e.g., azimuth angles) detected in association with a point detected via a sensor. In some embodiments, sensor data associated with stationary points may be used to identify such angle errors. A stationary point refers to a point that corresponds with an object that is stationary in the real world. Examples of stationary points that correspond with an object that is stationary include points that represent or correspond with stationary objects including traffic lights, road edges, parked cars, standing pedestrians, standing bicycles, etc. In some cases, a point may be identified as stationary based on a Doppler shift associated with the point. In this way, by analyzing Doppler shift and/or Doppler velocity associated with a reflected radar signal, a determination may be made as to whether the point corresponds with a stationary or moving object.

Using stationary points, a velocity vector projected into the direction an ego-machine is moving may be equal to the ego-machine speed as well as any noise or error. Noise or error may occur in accordance with various aspects of data or measurements. For example, error may be generated in association with angle data, Doppler velocity data, and ego-machine speed.

Accordingly, to determine angle error associated with a sensor, such as a RADAR sensor, ego-machine velocity may be compared to observed movement associated with a stationary point. In particular, ego-machine velocity should be equal to the observed movement associated with a stationary point. In addition, multiple unknown errors may be included in this comparison or equation. For example, unknown errors may include a Doppler velocity error, an angle error, and an ego-machine speed (or sensor motion). In this way, three error components may be included in the equation.

In embodiments, an equation or a system of equations may be used to identify angle error. In this regard, numerical minimization may be performed to determine quantities for the unknown error components in an effort to make the optimization error zero. The optimization error desired to be minimized may be the difference between the actual or observed value(s) and the value(s) predicted or estimated. As multiple unknown errors may exist (e.g., three different errors), using multiple equations or a system of equations (e.g., three equations) may facilitate more accurate error estimations. By way of example only, using three detections from a RADAR sensor, a minimization process may be executed to obtain a solution for angular error, Doppler velocity error, and ego-machine speed error.

A representation of angle errors (e.g., a scatter plot) may be generated to represent various identified angle errors across angles associated with the sensor. For example, a scatter plot may be generated that plots regressed angle errors identified from minimizing over an angle (e.g., azimuth angle) associated with a sensor. A scatter plot is provided as an example for illustrative purposes, but not necessary for in-vehicle usage.

For various angles, or angle ranges, a distribution of angle errors associated with the corresponding angle, or angle range, may be generated. For example, angle errors corresponding with 20 degrees of azimuth angle may be selected and used to generate a data distribution of angle errors corresponding with 20 degrees. The data distribution may be used to determine a local angle bias error. For instance, assume the data distribution of angle errors corresponding with 20 degrees results in a mean of 0.5. In such a case, the local angle bias error corresponding with 20 degrees may be designated as 0.5 degrees. Such a local bias error may be identified for various angles associated with a field of view of a sensor (e.g., each angle or a range of angles). For instance, an angle bias error may be generated for each angle or angle range across a field of view of a sensor (e.g., RADAR sensor).

Using the local bias errors, a representation of angle bias errors may be generated. Such a representation of angle bias errors represents the various local bias errors across angles associated with the sensor. As one example, a plot or graph illustrating an extent of angle bias error associated with a series of angles may be generated (e.g., −45 degrees to +45 degrees of a sensor field of view). Such a plot or graph is provided as an example for illustrative purposes, but may not be used for in-vehicle usage.

In accordance with identifying a representation of bias errors for a sensor, the representation of bias errors may be used to correct subsequently collected angle data. In this regard, subsequent angle sensor data detected by the sensor may be corrected to account for the angle bias error associated with the sensor. For example, assume a sensor detects a point measured at 20 degrees (e.g., for generating a point cloud). The representation of bias errors may be accessed to recognize an angle bias error of 0.5 at 20 degrees. In such a case, corrected angle data may be generated indicating 19.5 degrees for association with the observed point.

As such, the techniques described herein may be used to identify angle bias error and, thereafter, use such identified angle bias error to correct for such bias. The generated corrected angle data may be provided to an autonomous or semi-autonomous vehicle drive stack to aid in the performance in one or more operations related to localization, safe planning, and/or control of an ego-machine. As such, accurate angle data detected in association with a sensor may aid an autonomous or semi-autonomous vehicle or machine in navigating a physical environment, and specifically may aid in object perception and planning for more accurate and reliable navigation. In particular, corrected angle measurements have a lower noise and higher accuracy than uncorrected, raw measurements and, as such, allow downstream modules to perform better, leading to higher availability and safer operation of the ego-machines. Unlike conventional approaches, various embodiments provide a way to enable accurate and efficient identification of accurate angle data that may be acted upon, thereby allowing for more precise navigation instructions than in conventional methods. For example, embodiments enable identification of accurate angle data without requiring specific reference geometry (e.g., straight highway guard rail) and/or specific driving maneuvers (e.g., straight driving). As such, embodiments described herein enable a more adaptable approach. Further, various embodiments may be more efficiently performed as identification of specific reference geometry and/or driving maneuvers is unnecessary.

With reference to FIG. 1, FIG. 1 is a data flow diagram illustrating an example process 100 for a bias error identification and correction system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1000 of FIGS. 10A-10D, example computing device 1100 of FIG. 11, and/or example data center 1200 of FIG. 12.

Such a bias error identification and correction system facilitates angle bias error identification and correction, in accordance with some embodiments of the present disclosure. In some embodiments, the example process 100 represents a possible way to identify angle bias error in association with a RADAR sensor and correct for the angle bias error in association with the RADAR sensor. In some embodiments, the components illustrated in FIG. 1 may be implemented in an ego-machine. For example, the input generator 104 and/or the bias error manager 108 may operate in an ego-machine to provide, in real-time, corrected data, which may be used perform localization, navigation, and/or decision making. In other embodiments, one or more of the components illustrated in FIG. 1 may be implemented remote from an ego-machine. For instance, the input generator 104 and/or bias error manager 108 may operate in a server or remote computing device that communicates with the ego-machine.

At a high level, the process 100 uses a bias error manager 108 configured to identify and correct bias error, such as angle bias error. In particular, bias error associated with angles detected via a sensor(s) may be identified based on sensor data 102 of a three dimensional (3D) environment. The sensor data 102 may be pre-processed by an input generator 104 into input data 106 that has a format that the bias error manager 108 is configured to accept and process, and the input data 106 may be fed into the bias error manager 108 to identify bias error and/or generate corrected data 116.

Figure 2:
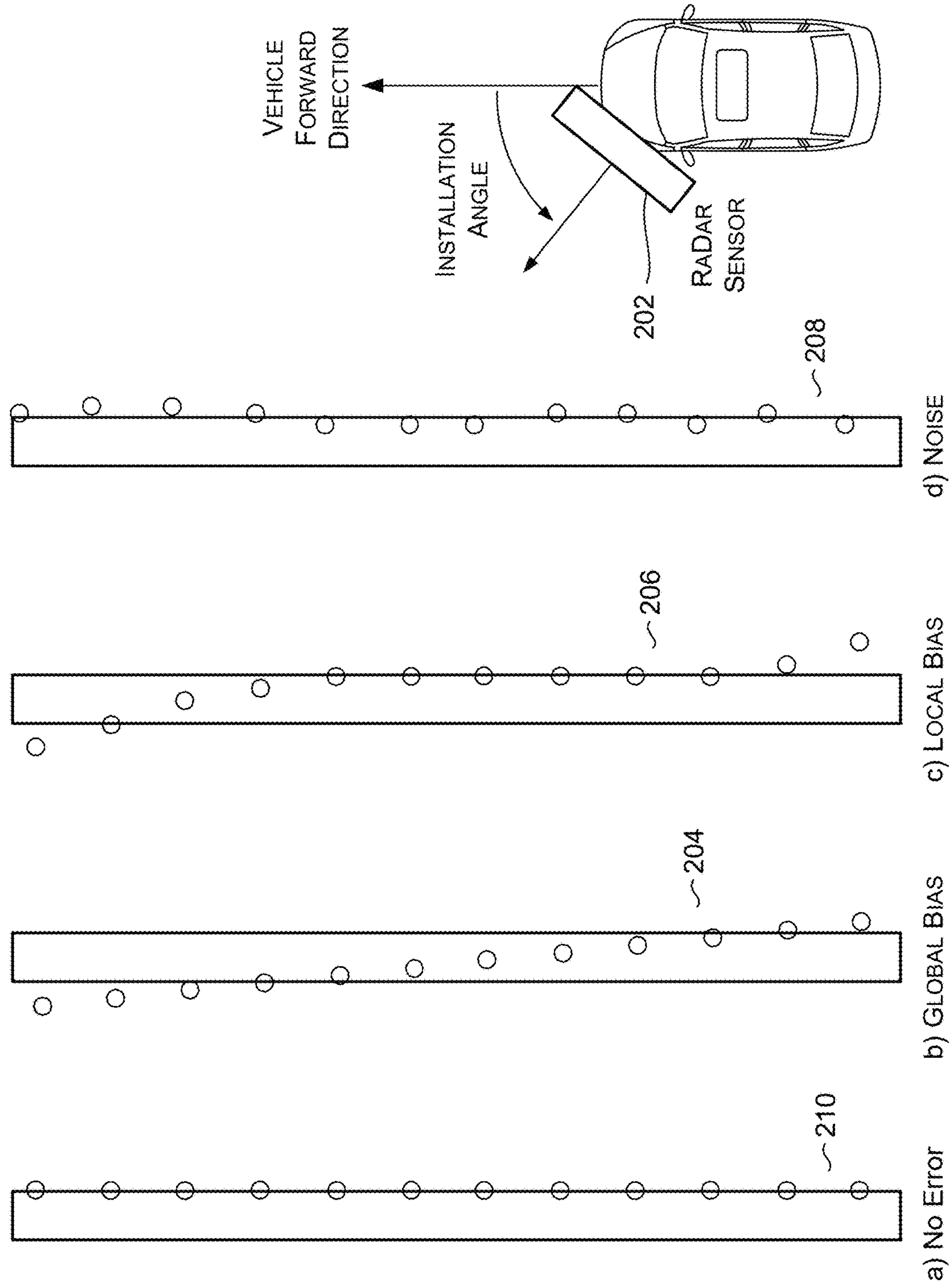
FIG. 2 is an illustration of an example of a RADAR sensor positioned on an ego-machine, in accordance with some embodiments of the present disclosure.

By way of example only, and with reference to FIG. 2, FIG. 2 illustrates a RADAR sensor 202 positioned on an ego-machine to detect objects in the environment. In this example, the RADAR sensor 202 has a field of view from approximately −90 degrees to +90 degrees. Assume the RADAR sensor 202 detects an object. In such a case, sensor data associated with such object detection may be obtained, including an angle associated with the object. Using such sensor data, as well as sensor data with other detected objects, angle bias error can be identified for various angles associated with the RADAR sensor 202. In embodiments, a representation of the angle bias errors may be generated for use in correcting subsequent data. For example, as illustrated in FIG. 2, the circles represent the measured detections relative to a roadside geometry. In this illustration, detections 204 provide an example of global bias (e.g., a rotation of detected geometry), detections 206 provide an example of local bias (e.g., deformation of detected geometry), and detections 208 provide an example of noise (e.g., blurred border). Even small angular errors may have a large impact on the position of detected objects (e.g., static and/or dynamic objects). For instance, with an angular error of one mispositioned degree, an object at a distance of 100 m in front of the ego vehicle may be by 1.75 meters (e.g., resulting in assignment of an incorrect lane). On the other hand, detections 210 provide an example of an error-free radar scans that align with the geometry of the obstacle.

In some embodiments, bias error identification and/or correction may be performed using sensor data 102 from any number and any type of sensor, such as a RADAR sensor(s), as further described below with respect to the autonomous vehicle 1000. For example, the sensor(s) 101 may include one or more sensor(s) 101 of an ego-machine—such as RADAR sensor(s) 1060 of the autonomous vehicle 1000—and the sensor(s) 101 may be used to generate sensor data 102 that represents perceptions in the 3D environment in association with an ego-machine(s) as well as objects in the 3D environment around the ego-machine(s).

In accordance with various embodiments described herein, sensor(s) 101 may be in the form of a RADAR sensor. A RADAR sensor may be positioned on an ego-machine in a manner that may detect sensor data 102 in association with the environment of the ego-machine. For example, a RADAR sensor may be placed in strategic locations to optimize functionality, such as a front bumper, a rear bumper, a side mirror, a grille or emblem (e.g., on front of ego-machine), a roofline, and/or inside the ego-machine. In some cases, various RADAR sensors may be positioned around the vehicle.

In operation, a RADAR sensor generally emits electromagnetic waves that travel outward from the sensor at the speed of light. When the waves encounter an object in the environment (e.g., a vehicle, person, bike, etc.), the waves bounce off or reflect off the surface of the object. The RADAR sensor includes a receiver that listens for the echoes of the transmitted waves. In accordance with receiving an echo, the RADAR sensor may process the information received from the echoes to generate various sensor data (e.g., sensor data 102), such as the distance, speed, and size of the detected objects. For example, the RADAR sensor may calculate the time for the wave to travel to the object and back. Based on the speed of light and the time for the wave to return, the RADAR sensor may calculate the distance to the object. Further, by measuring changes in the frequency of the returning waves (Doppler effect), the RADAR sensor may determine the speed and direction of the object relative to the RADAR sensor.

In embodiments corresponding to the illustration of FIG. 1, the input generator 104 obtains sensor data 102. As described, sensor data may refer to data or information detected, collected, and/or determined by a sensor(s). In some cases, sensor data is collected by a sensor(s) located or positioned in association with an ego-machine (e.g., mounted to an exterior of an ego-machine). Accordingly, the sensor(s) may obtain sensor data representing the environment surrounding or around the ego-vehicle, such as detections from guard rails along the highway, pedestrians, bicycles, traffic lights, etc.

Sensor data 102 may include various types of data. In one embodiment, sensor data includes RADAR sensor data. RADAR sensor data may include information collected by a RADAR sensor(s). RADAR sensor data may include various measurements or parameters related to objects detected in the environment surrounding a RADAR sensor(s). Such RADAR sensor data may correspond with an object in the environment. As described, RADAR sensor data may include angle data, distance data, size data, velocity data, Doppler effect data, and/or Doppler velocity data.

Angle data may refer to an angle at which an object is detected relative to a position of a sensor, such as a RADAR sensor. In this way, angle data may be an angular measurement that corresponds to a direction in which a radar beam is pointing when it detects an object. Angle data may be represented in azimuth and/or elevation angles relative to a RADAR sensor's reference frame. An azimuth angle may refer to a horizontal angle measured clockwise from a reference direction to the direction of interest. An azimuth angle may be expressed in degrees ranging from 0 to 360. An elevation angle may refer to a vertical angle measured from the horizontal plane to a line of sight or direction of interest. An elevation angle may be measured in degrees above or below a horizontal plane.

Distance data may refer to a distance from a sensor (e.g., RADAR sensor) to a detected object. In this regard, a RADAR sensor may measure the time it takes for a radar pulse(s) to travel to an object in the environment and return as an echo(s). By multiplying this round-trip time by the speed of light, a RADAR sensor can calculate the distance to the object. A distance measurement may be referred to as range or slant range and represent a straight line distance from a radar sensor (e.g., antenna) to an object.

In addition to angle data and distance data, sensor data may also include a size, a velocity, a Doppler shift, a Doppler velocity, etc. A size may refer to an estimate of a size or cross-sectional area of a detected object. A velocity may refer to a speed and direction of movement of the detected object relative to a RADAR sensor. A velocity may be measured, for example, by measuring the time it takes for a RADAR signal to travel to the object and back (e.g., time of flight) or by using phase differences in the RADAR signal (e.g., phase-shift radar).

A Doppler shift or Doppler effect refers to a change in a frequency of a reflected radio wave due to the motion of a detected object. A Doppler shift may occur when there is relative motion between the RADAR sensor and an object. If an object is moving towards a RADAR sensor, a frequency of a reflected signal is higher than a transmitted frequency, resulting in a positive Doppler shift. If an object is moving away from a RADAR sensor, a frequency of a reflected signal is lower than a transmitted frequency, resulting in a negative Doppler shift.

A Doppler velocity may refer to a component of an object's velocity that is determined through the Doppler effect. The Doppler velocity indicates how fast an object is moving towards or away from a RADAR sensor along the line of sight. In particular, when an object is moving relative to a RADAR sensor, the frequency of the RADAR signal reflected off the object is shifted due to the motion-induced change in the signal's wavelength. This frequency shift, referred to as the Doppler shift or effect, relates to the radial velocity component (velocity component along the line of sight) of the moving object. Doppler velocity measurements may be based on analyzing this frequency shift in the returned RADAR signals. In other words, by analyzing the frequency shift of the reflected RADAR signal, the Doppler velocity of an object relative to a RADAR sensor may be calculated.

In accordance with obtaining sensor data 102, the input generator 104 may generate a sensor data representation, in the form of input data 106. A sensor data representation may refer to a representation of sensor data that may be in a form acceptable to the bias error manager 108 for performing angle bias error identification and/or correction thereof.

In some embodiments, the input generator 104 may generate individual points, or point representations, representing an object or surface detected within a field of view of a sensor (e.g., a RADAR sensor). In this regard, the input generator 104 may process or analyze sensor data 102 (e.g., raw sensor data) to generate the individual points. A point, or a point representation, may represent a specific location and other attributes associated with the object or surface detected by a sensor. In this way, an individual point may be generated in association with any type of sensor data. As one example, an individual point may be associated with a specific angle data, or angular measurement, that indicates a direction from which the radar beam detected the object and/or a specific distance data, or distance measurement, that indicates how far away an object is from a radar sensor (e.g., a radar antenna), among other types of data or measurements.

In some embodiments, the input generator 104 may generate a representation of a set of points. A representation of a set of points may be in the form of a point cloud. A point cloud may be a collection of points in a three-dimensional coordinate system. As described, each point may represent a specific location and other attributes associated with the object or surface detected by a sensor.

For example, in accordance with embodiments described herein, a point cloud may be in the form of a RADAR point cloud that includes a collection of points generated based on sensor data associated with one or more RADAR sensors. In this regard, each point in the point cloud may correspond to a set of coordinates in the x, y, and/or z axes, along with attributes including angle data, distance data, velocity data, Doppler velocity data, etc. By combining angular measurements (azimuth and/or elevation angles) with distance measurements (range) (e.g., among other things), a three-dimensional representation of the objects in the environment may be generated in the form of a radar point cloud. Stated differently, angular and distance measurements may position a point within a point cloud relative to a RADAR sensor's location and orientation.

A point cloud, such as a RADAR point cloud, may represent data captured within a specific field of view at a particular time instance. In this regard, a particular RADAR point cloud may include various points corresponds with objects detected in the environment of a RADAR sensor at a particular instance. Any number of point clouds may be generated in accordance with the progression of time (e.g., based on a regular interval or occurrence of an event(s)).

In accordance with generating a representation of points (e.g., a RADAR point cloud), the input generator 104 provides the representation of sensor data as input data 106 to the bias error manager 108. At a high level, the bias error manager 108 is generally configured to manage identification and/or correction of bias error associated with sensor data, such as angle data. In particular, the bias error manager 108 may identify bias error using the input data 106 and, thereafter, use the bias error to generate corrected data 116.

In the embodiment illustrated in FIG. 1, the bias error manager 108 includes a stationary point identifier 110, a bias error identifier 112, and a bias error corrector 114. At a high level, the stationary point identifier 110 is generally configured to identify stationary points associated with the input data 106. Using the stationary points, the bias error detector 112 is generally configured to detect or identify bias error, such as angle bias error. Based on the detected bias error, the bias error corrector 114 may correct for bias error.

As described, the stationary point identifier 110 is generally configured to identify stationary points. In particular, the stationary point identifier 110 may analyze input data 106, for example, in the form of a RADAR point cloud(s) and identify a set of points that are stationary. A stationary point may refer to a point that corresponds with an object that is stationary in the real world. Examples of stationary points that correspond with an object that is stationary include points that represent or correspond with stationary objects including traffic lights, road edges, parked cars, standing pedestrians, standing bicycles, etc.

In some cases, a point may be identified as stationary based on a Doppler shift associated with the point. In this way, by analyzing Doppler shift and/or Doppler velocity associated with a reflected radar signal, a determination may be made as to whether the point corresponds with a stationary or moving object. For instance, a stationary object and/or point may be identified when the Doppler velocity calculated from the Doppler shift is close to zero (e.g., within a threshold determined by sensitivity and noise level). On the other hand, a moving object and/or point may be identified when Doppler velocity is significantly different from zero.

In some cases, the stationary point identifier 110 may analyze various points (e.g., each point) in a point cloud or set of point clouds. For example, each point in a point cloud may be analyzed to determine whether the point is to be identified as a stationary point. In some embodiments, points may be designated or classified as stationary or moving points. A moving point may refer to a point that corresponds with a moving object. In this way, points may be classified or labeled as stationary or moving and, thereafter, the stationary points may be identified or selected for subsequent use in identifying bias error.

The bias error identifier 112 is generally configured to identify or detect bias error. In accordance with embodiments described herein, bias error may identify angle bias error associated with a sensor. As described, a sensor, such as a RADAR sensor, may result in distorted measurements. For example, based on placement of a sensor or a design of a sensor placed on an ego-machine, angle error, such as azimuth angle error, may result. As the distorted measurements may be consistently skewed or offset from true values, an error bias that systematically reflects error may result from the distorted measurements generated by the sensor. Accordingly, the bias error identifier 112 is configured to identify bias error such that the bias error can be adjusted for, thereby resulting in more accurate data.

To identify bias error, such as angle bias error, input data 106 may be analyzed. In some embodiments, the bias error identifier 112 analyzes points identified as stationary (e.g., via stationary point identifier 110) to identify angle error. Angle error generally refers to error of a detected angle. Advantageously, points associated with stationary objects may be used as fixed reference markers against which a sensor's readings can be compared. In this regard, analyzing sensor data deviation from known positions of stationary objects enables a more accurate detection and quantification of angle error. Although embodiments described herein generally refer to use of stationary points to identify angle error and, as such, angle bias error, embodiments are not limited herein. For instance, points corresponding with stationary and/or moving objects may be used to detect angle error.

Using stationary points, a velocity vector projected into the direction an ego-machine is moving may be equal to the ego-machine speed as well as any noise or error. Noise or error may occur in accordance with various aspects of data or measurements. For example, error may be generated in association with angle data, Doppler velocity data, and ego-machine speed.

Figure 3:
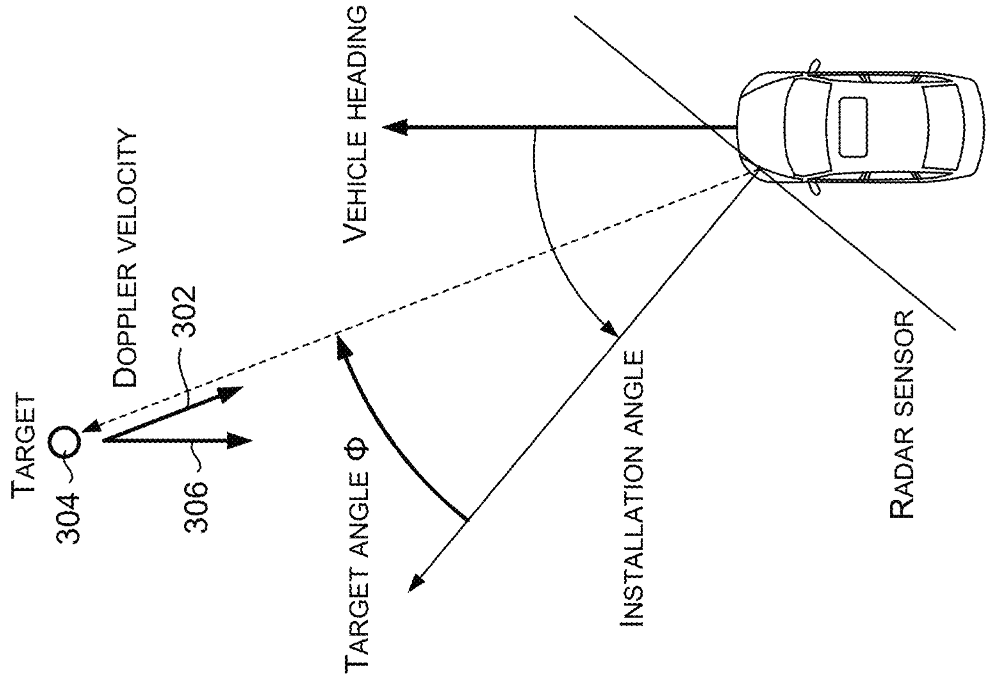
FIG. 3 is an illustration of an example of Doppler velocity, in accordance with some embodiments of the present disclosure.

Accordingly, to determine angle error associated with a sensor, such as a RADAR sensor, ego-machine velocity may be compared to observed movement associated with a stationary point to identify angle error. In particular, ego-machine velocity may be equal to the observed movement associated with a stationary point. In addition, multiple unknown errors may be included in this comparison or equation. For example, unknown errors may include a Doppler velocity error, an angle error, and ego-machine speed (or sensor motion). In this way, three error components may be included in the equation. With reference to FIG. 3, FIG. 3 illustrates Doppler velocity 302, which is measured in the beam direction. As the target 304 is stationary, and assuming everything is noise-free, a velocity vector 306 projected to the direction the vehicle is moving should be equal to the vehicle speed. In some cases, cosine transformation may be applied to identify a longitudinal component of the ego-machine speed. Various factors, such as angle error, Doppler velocity error, and ego-machine speed, however, can result in inequality.

Continuing with FIG. 1, the bias error identifier 112 may use such an equation or a system of equations to identify angle error. In some embodiments, numerical minimization may be performed to determine quantities for the unknown error components in an effort to make the optimization error zero. The optimization error desired to be minimized may be the difference between the actual or observed value(s) and the value(s) predicted or estimated. In some cases, such an equation can be used to minimize optimization error in association with data for a single point, such as a stationary point. In other cases, data associated with multiple points, such as stationary points, may be used to minimize optimization error. As multiple unknown errors may exist (e.g., three different errors), using multiple equations or a system of equations (e.g., three equations) may facilitate more accurate error estimations. By way of example only, using three detections from a RADAR sensor, a minimization process may be executed to obtain a solution for angular error, Doppler velocity error, and ego-machine speed error. Any number of equations may be used to minimize optimization error. As one example, 100 equations may be used to minimize optimization error in association with unknown errors. In some cases, more equations results in more confidence in the error estimations.

As can be appreciated, although data associated with multiple points may be used to determine unknown errors, a single value for each type of error may be determined using the system of equations. For instance, the unknown errors may represent the same variables for each equation in the system. In this way, the unknown errors are common across equations in the system, and their values may be determined in a way that minimizes the overall optimization error across the equations. In some cases, least squares regression may be used to find the values of the unknown errors, or common variables, that minimize the overall optimization error across equations simultaneously. In this way, the values of the unknown errors are determined in a manner that best fits the equations in the system collectively, rather than finding separate sets of unknowns for each equation.

In embodiments, to minimize error, regression may be used to minimize the optimization error. Generally, regression, or regression analysis, may be used to find a best-fitting mathematical model that describes the relationship between a dependent variable and one or more independent variables. A best-fitting model minimizes the difference between the observed values of the dependent variable and the values predicted by the model, which is generally performed by minimizing a measure of error.

Accordingly, the bias error identifier 112 may detect or identify the unknown errors, including the angle error associated with input data. Generally, the errors may be distributed randomly. For example, error in Doppler velocity may be distributed randomly around the true value. Assuming a perfect result would be zero error, a random noise distributed around the mean of zero may result. Error in vehicle speed may be similarly distributed randomly around the center.

Angle error, however, may not be distributed around zero, but around a bias, which is targeted for identification by the bias error identifier 112.

Identified errors, such as angle errors, may be stored in a data store. In some cases, only the angle errors are stored. In other cases, angle errors as well as other errors (e.g. ego-machine speed error and Doppler velocity error) are stored. In some embodiments, angle errors may be stored in association with each angle (e.g., azimuth angle) or angle range (e.g., range of azimuth angles), or another criteria.

The bias error identifier 112 may identify various angle errors for use in identifying angle bias errors. In this regard, identifying unknown errors, as described above, may be performed repetitively. For example, unknown error determination may be applied to numerous data associated with various RADAR returns (e.g., RADAR point clouds). Such results from the various applications may be accumulated or aggregated. For example, for a first RADAR point cloud, one or more angle errors may be identified using one or more systems of equations, for a second RADAR point cloud, one or more angle errors may be identified using one or more systems of equations, and so on.

In some cases, the various angle errors may be identified and used to generate a representation of angle errors. As one example, a representation of angle errors may be in the form of a plot, such as a scatter plot, or other representation (e.g., data visualization) of the relationship between two variables, such as angle error and angle (e.g., azimuth angle represented in degrees). A scatter plot may plot the regressed angle error for solutions from minimizing over an angle (e.g., azimuth angle) associated with a sensor. Although a scatter plot is provided as an example, any representation of angle errors may be generated.

Figure 4:
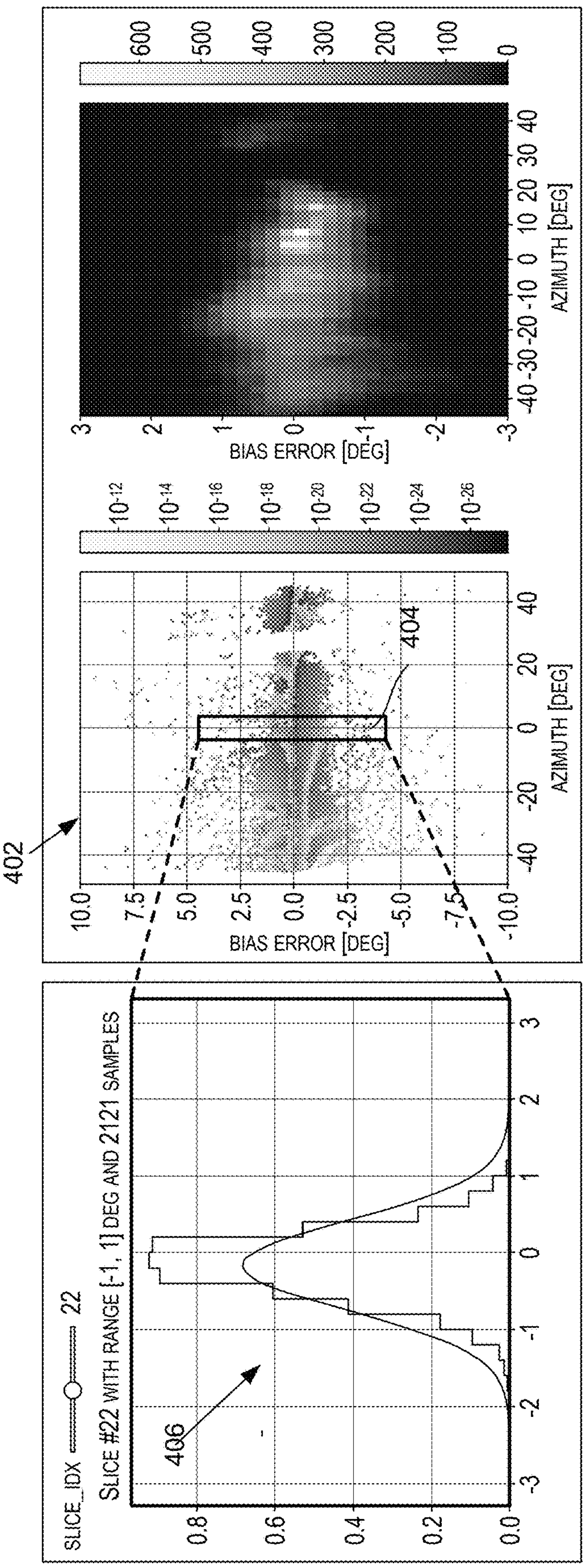
FIG. 4 is an illustration of a representation of angle errors, in accordance with some embodiments of the present disclosure.

By way of example, and with reference to FIG. 4, FIG. 4 illustrates a representation of angle errors 402. In this example, the representation of angle errors 402 is in the form of a scatter plot that plots angle errors along a field of view, or a portion thereof. Such plotted points may be based on various point clouds associated with a RADAR.

To identify bias error, the bias error identifier 112 may generate a distribution of the angle errors associated with an angle or angle range. In embodiments, a distribution is generated using a representation (e.g., scatter plot) of a relationship between angle error and angle. To generate a distribution, a portion or slice of a scatter plot may be used. For example, and with continued reference to FIG. 4, assume a slice 404 or portion of data points from the representation of angle errors 402 around zero degrees of azimuth angle are obtained. Such data around zero degrees is used to generate a distribution 406, as illustrated in FIG. 4. Portions or slices of various angles or angle ranges can be identified. For instance, a distribution around zero degrees, one degree, 20 degrees, etc. For each slice of data points (e.g., associated with a degree of range of degrees), a data distribution is generated and a local angle error bias may be estimated. In this example, the angle error is distributed near zero, at approximately −0.1. Because the distribution is not centered around zero, the amount offset (e.g., −0.1) may be identified as the bias error in association with zero degrees for which a correction may be applied.

In this regard, the bias error identifier 112 may use a distribution for each angle or angle range associated with a sensor to identify an angle bias error associated with the angle or angle range. In this way, an angle bias error may be generated for various (e.g., each) angle or angle range across a field of view of a sensor (e.g., RADAR sensor). By way of example only, assume a field of view for a sensor is from −45 degrees to +45 degrees. Further assume that a distribution is generated in association with each degree between −45 and +45. In such a case, an angle bias error may be determined for each degree between −45 and +45.

An angle bias error for a particular angle may represented in any of a number of ways. In some cases, the mean of the distribution in association with each data slice (e.g., for a particular angle) may be used as the angle bias error. Further, in some embodiments, uncertainty of the angle bias error may be determined, for example, using the data distribution. In this way, for a distribution, a mean and a standard deviation may be determined to identify an angle bias error and uncertainty thereof. The mean and standard deviation may then be used to represent or reflect the angle bias error for the corresponding angle or angle range.

Using the angle bias errors for various angles, the bias error identifier 112 may generate a representation of angle bias errors corresponding with a sensor, such as a RADAR sensor. For example, for various angles of the field of view of the sensor (e.g., each angle or each angle range, such as two degree increments), the angle bias error may be represented (e.g., via a mean and/or standard deviation). In some embodiments, the angle bias errors are represented via a graph representation or a function, which may also be referred to herein as a bias error characterization.

Figure 5:
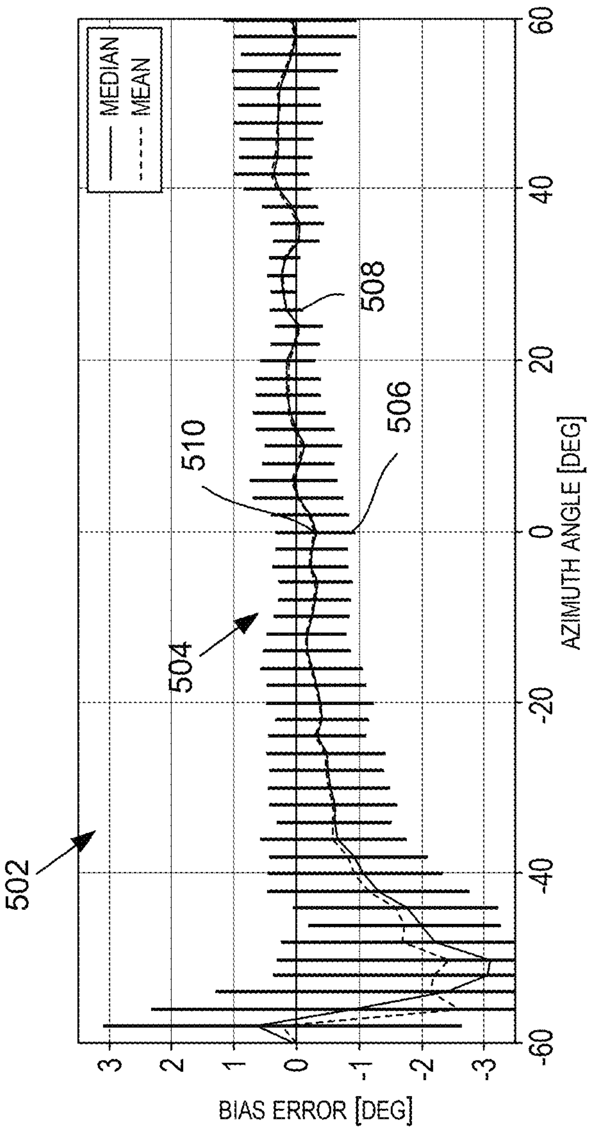
FIG. 5 provides an example representation of angle bias errors, in accordance with some embodiments of the present disclosure.

As one example, and with reference to FIG. 5, an example representation of angle bias errors 502 is provided. In this example, the angle bias errors 504 are graphed between negative sixty degrees and positive sixty degrees. In this example, angle bias errors are plotted in two degree increments. The vertical lines, such as line 506, indicate extents of uncertainty, and the charted horizontal line 508 represents the average bias error. For example, at an angle of zero degrees, the average bias error 510 appears to be indicated as −0.3 degrees, and the extent of uncertainty 506 appears to range from about 0.3 to −1 degrees.

Figure 6:
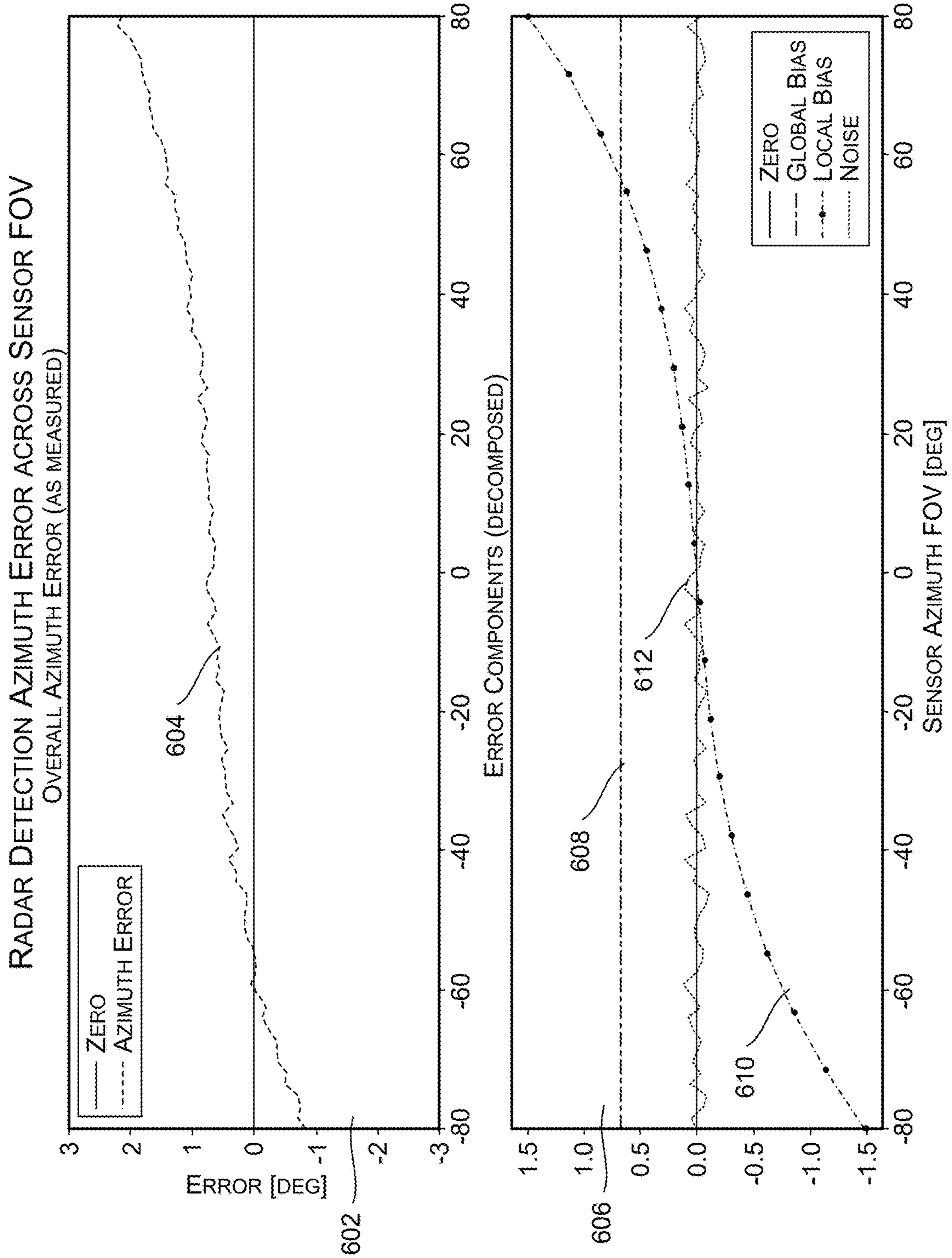
FIG. 6 provides an example representation of angle bias errors across a field of view, in accordance with embodiments of the present disclosure.

FIG. 6 provides an example of angle error bias across a field of view. In particular, graph 602 provides an example error curve 604 of azimuth measurement errors across the field of view of a sensor. Graph 606 provides an example of the overall error decomposed into components. As illustrated, the overall error is decomposed into a global bias 608, a local bias 610, and a noise 612. The global bias may reflect sensor misalignment versus a known nominal position, for example. The local bias may be reflective of a cover in front of a radar sensor, internal properties of the sensor hardware, etc. Noise may reflect high-frequency perturbations due to measurement inaccuracies, as one example.

In one implementation, a bias function may be used to identify angle bias errors. A bias function may be estimated using measured data associated with a measured range rate $\hat{\dot{R}}$, a measured azimuth angle $\hat{\Phi}$, a measured vehicle speed $\hat{v}_s$, and a bias b. In such a case, the negative log likelihood may be expressed as:

$$E = \frac{[\hat{v}_s - v_s]^2}{\sigma_{v_s}^2} + \frac{\left|\hat{\dot{R}} - v_s\cos(\phi - \phi_{inst})\right|^2}{\sigma_{\dot{R}}^2} + \frac{\left|\hat{\phi} - (\phi + b)\right|^2}{\sigma_{\phi}^2}$$

In such an expression, the uncertainties of the observation noises $\sigma_{v_s}$, $\sigma_{\dot{R}}$ and $\sigma_\phi$ may be determined through experiments. For a measured stationary detection with $\hat{\phi}$, $\hat{\dot{R}}$ $\hat{v}_s$, the bias b may be obtained by minimizing the above equation to find a set of ($v_s$, $\phi$, b). The estimated pairs ($\phi$, b) from each single detection may be distributed around the actual bias function ($\phi$, $f(\phi)$) due to noise in the input data. Next, the pairs ($\phi$, b) are aggregated for a large number of detections from various driving scenarios and environmental conditions. Aggregation may be performed using a piecewise linear curve estimator that consists of histogram slices. The configured field of view [$\phi_{min}$, $\phi_{max}$] the sensor is sliced into N bins. Each bin may be implemented using a histogram spanning [$b_{min}$, $b_{max}$] with $N_b$ bins. For each detection, b of the pair ($\phi$, b) resulting from minimization is inserted into the histogram corresponding to $\phi$. A weight may be calculated when inserting b into the histogram based on several factors (e.g., radar detection properties as well as solver properties such as final residual, etc.). Once estimation completes, the mean and standard deviation of each bin may be extracted to approximate ($\phi$) and its variance. Example values for the piecewise linear curve estimator include:

[$\phi_{min}$, $\phi_{max}$]=[−80 deg, 80 deg] and $N_\phi$=161, resulting in a $\phi$-resolution of 1 degree

[$b_{min}$, $b_{max}$]=[−5 deg, 5 deg] and $N_b$=100, resulting in a ($\phi$)-resolution of 0.01 degrees.

In this way, for each radar scan from a sensor, a vehicle speed may be obtained and, thereafter, a determination may be made as to whether vehicle motion is suitable for estimation. If so, for each detection in the radar scan, the negative log likelihood equation provided above may be minimized to obtain a pair ($\phi$, b), and a corresponding weight may be calculated. The pair and weight may be inserted into a piecewise linear estimator. Thereafter, convergence of the piecewise linear estimator is checked to steady state. In cases in which a convergence is identified, the mean and standard deviation of each bin may be calculated and the estimated model output.

In some cases, the angle bias errors, or a representation thereof, may be stored in a data store for subsequent use. For example, angle bias error associated with each angle (or other angle range) may be stored in a data store (e.g., via an index) for subsequent use for performing bias error correction.

Turning to the bias error corrector 114 of FIG. 1, the error bias corrector 114 is generally configured to correct data in association with an identified bias error, such as angle bias error identified via bias error identifier 112, to generate corrected data 116. In embodiments, sensor data to which the correction is applied may be the sensor data from which the bias error is identified. In other embodiments, sensor data to which the correction is applied may be subsequently obtained sensor data. For example, in accordance with identifying angle bias error associated with a sensor, subsequent sensor data detected by the sensor may be corrected to account for the angle bias error associated with the sensor.

In one embodiment, angle bias errors and corresponding angles (or angle ranges) may be accessed (e.g., via a data store) and used to correct for bias error. For example, assume a sensor detects a point measured at 40 degrees (e.g., for generating a point cloud). In such a case, the bias error corrector 114 may reference or access a representation of angle bias errors (e.g., an index, graph, table, or function to do a reverse lookup) to recognize an angle bias error of +0.5 at 40 degrees. In such a case, the bias error corrector 114 may generate corrected data 116 indicating 39.5 degrees for association with the observed point.

In embodiments in which a new RADAR scan is performed to generate a new point cloud, the bias error corrector 114 may correct for various points, as needed, in the new RADAR scan to generate corrected data 116. For instance, for each point in a new RADAR point cloud, the bias error corrector 114 may correct for angle, if appropriate, based on the corresponding angle bias error, as identified via a representation of angle bias errors. As such, the corrected data 116 may be the corrected data or a set of data that includes the corrected data, such as a point cloud.

In some embodiment, the bias error corrector 114 may generate and/or apply a correction function to correct for angle bias error. As one example, to correct for bias error, the target azimuth angle $\hat{\phi}$ measured by a radar sensor includes the actual target angle $\phi$, a systematic bias error $f(\phi)$ that can be estimated through calibration and measurement noise $\tilde{\phi}$:

$$\hat{\phi} = \phi + f(\phi) + \tilde{\phi}$$

The error function ($\phi$) may be calculated across the horizontal field of view of a RADAR sensor and can be used to correct measurement errors. One example of a correction function $f(\phi)$ may be approximated as a piecewise linear function $f(\phi_i)$ with equidistant supports:

$$\phi_i = \phi_{min} + i \cdot \Delta\phi$$

wherein i∈[0, N−1], with $$N = \frac{\phi_{max} - \phi_{min}}{\Delta_\phi} + 1$$

To use the error function to correct for bias error and ignoring noise, the actual target angle $\phi$ can be reconstructed given $\hat{\phi}$ and $f(\phi)$ by solving the following equation for $\phi$:

$$\hat{\phi} = \phi + f(\phi)$$

In some cases, the error function ($\phi$) may be inverted to identify a bias error. In other cases, instead of inverting ($\phi$) in accordance with its non-monotonic nature, a monotonic approach may be used, which generally adds the target angle to the error function. In this regard, g($\phi$) may be defined as:

$$g(\phi) = \phi + f(\phi)$$

where g($\phi$) is monotonic as long as $$\frac{d}{d\phi} f(\phi) > -1 \forall \phi \in [FOV]$$

In such a case, $\hat{\phi}$=g($\phi$), which may be solved for $\phi$ by exchanging the supports and values of the piecewise linear function.

In embodiments, generating corrected data 116, such as corrected angle data, may be performed in an online or real time manner. In this way, accurate angle data can be determined and used for performing various aspects of ego-machine navigation.

Continuing with FIG. 1, the corrected data 116, such as corrected angle data may be provided for use by the vehicle

1000 of FIGS. 10A-10D in performing one or more operations, such as localization, navigation, and/or others. For example, a RADAR point cloud having corrected angle data may be provided and used by control component(s) of the vehicle 1000, such as an autonomous driving software stack 122 executing on one or more components of the vehicle 1000 of FIGS. 10A-10D (e.g., the SoC(s) 1004, the CPU(s) 1018, the GPU(s) 1020, etc.). For example, the vehicle 1000 may use this information (e.g., instances of obstacles) to localize its position in a map, to navigate, plan, or otherwise perform one or more operations within the environment.

In some embodiments, the corrected data(s) 116 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle, or collision avoidance layer of the drive stack 122), actuation component(s) 134 (e.g., corresponding to an actuation layer of the drive stack 122), and/or other components corresponding to additional and/or alternative layers of the drive stack 122. The process 100 may, in some examples, be executed at least in part by or in association with the perception component(s), which may feed up the layers of the drive stack 122 to the world model manager, as described in more detail herein.

The sensor manager may manage and/or abstract sensor data from the sensors of the vehicle 1000. For example, and with reference to FIG. 10C, the sensor data may be generated (e.g., perpetually, at intervals, based on certain conditions) by the LIDAR sensor(s) 1064, the RADAR sensor(s) 1060, the ultrasonic sensor(s) 1062, the stereo camera(s) 1068, other camera(s), and/or other sensors). The sensor manager may receive the sensor data from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1000 may use the uniform format, thereby simplifying processing of the sensor data. In some examples, the sensor manager may use a uniform format to apply control back to the sensors of the vehicle 1000, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that may be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1000 is allowed to drive or is capable of driving (e.g., based on the location of the drivable or other navigable paths defined by avoiding detected obstacles in the environment and/or detected protuberances in the road surface), and how fast the vehicle 1000 can drive without colliding with an obstacle (e.g., an object, such as a structure, entity, vehicle, etc.) that is sensed by the sensors of the vehicle 1000.

The path perceiver may perform path perception, such as by perceiving nominal paths that are available in a particular situation. In some examples, the path perceiver may further take into account lane changes for path perception. A lane graph may represent the path or paths available to the vehicle 1000, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information. In some embodiments, the path perceiver may take into account a detected lane graph. For example, the path perceiver may evaluate a reconstructed 3D road surface to identify lane changes and lane merges.

The wait perceiver may be responsible to determining constraints on the vehicle 1000 as a result of rules, conventions, and/or practical considerations. For example, the rules, conventions, and/or practical considerations may be in relation to a 3D road surface, traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver. In some embodiments, the wait perceiver may take into account a detected lane graph(s). For example, the wait perceiver may evaluate a reconstructed 3D road surface to identify an approaching lane merge and determine to apply and/or apply an early acceleration or deceleration to accommodate the approaching lane merge.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1000 of static or stationary infrastructure objects and obstacles. The map perceiver may also generate information for the wait perceiver and/or the path perceiver, for example, such as to determine which light at an intersection has to be green for the vehicle 1000 to take a particular path.

Figure 10A:
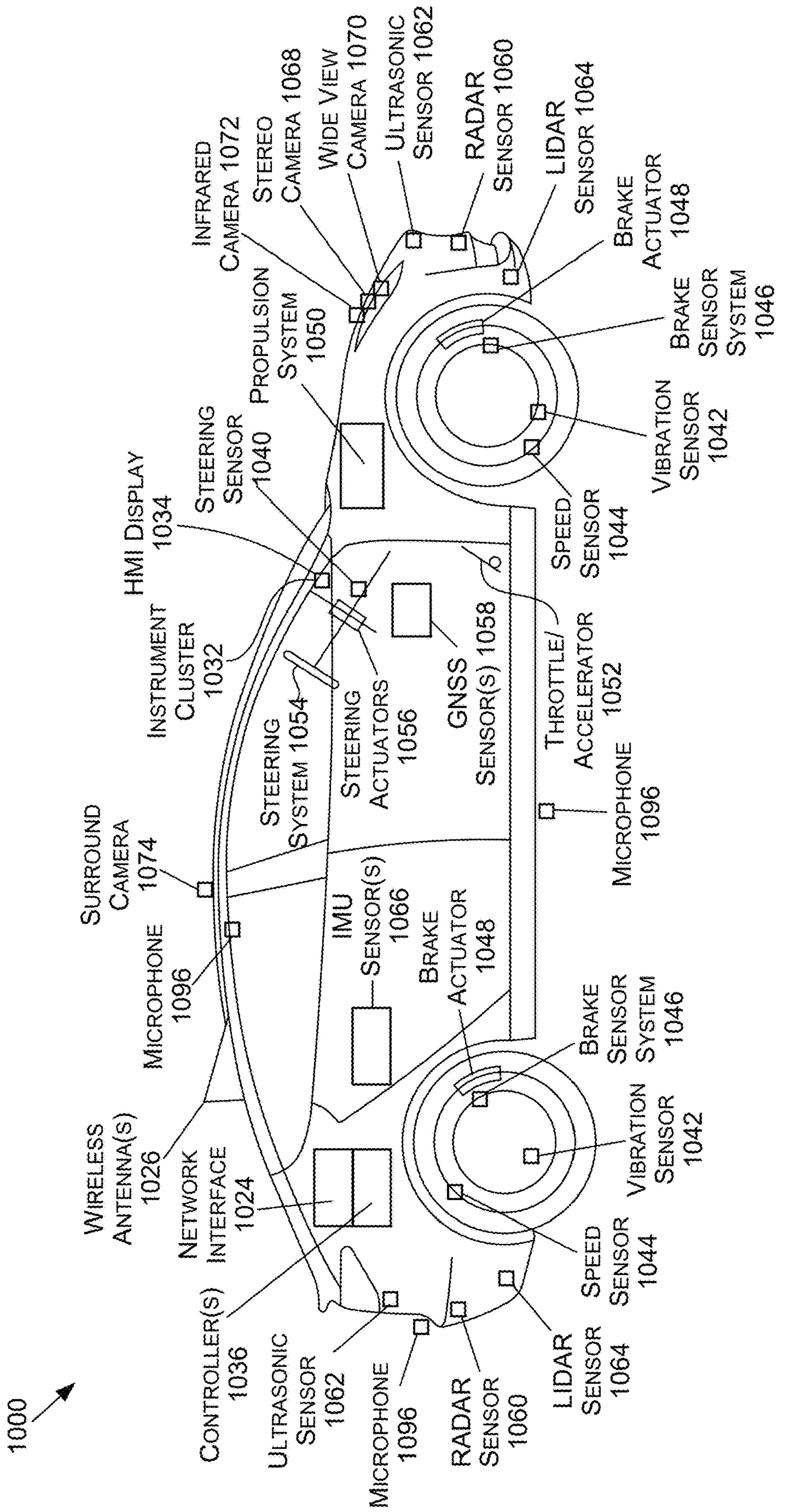
FIG. 10A is an illustration of an example autonomous vehicle, in accordance with some embodiments of the present disclosure.
Figure 10B:
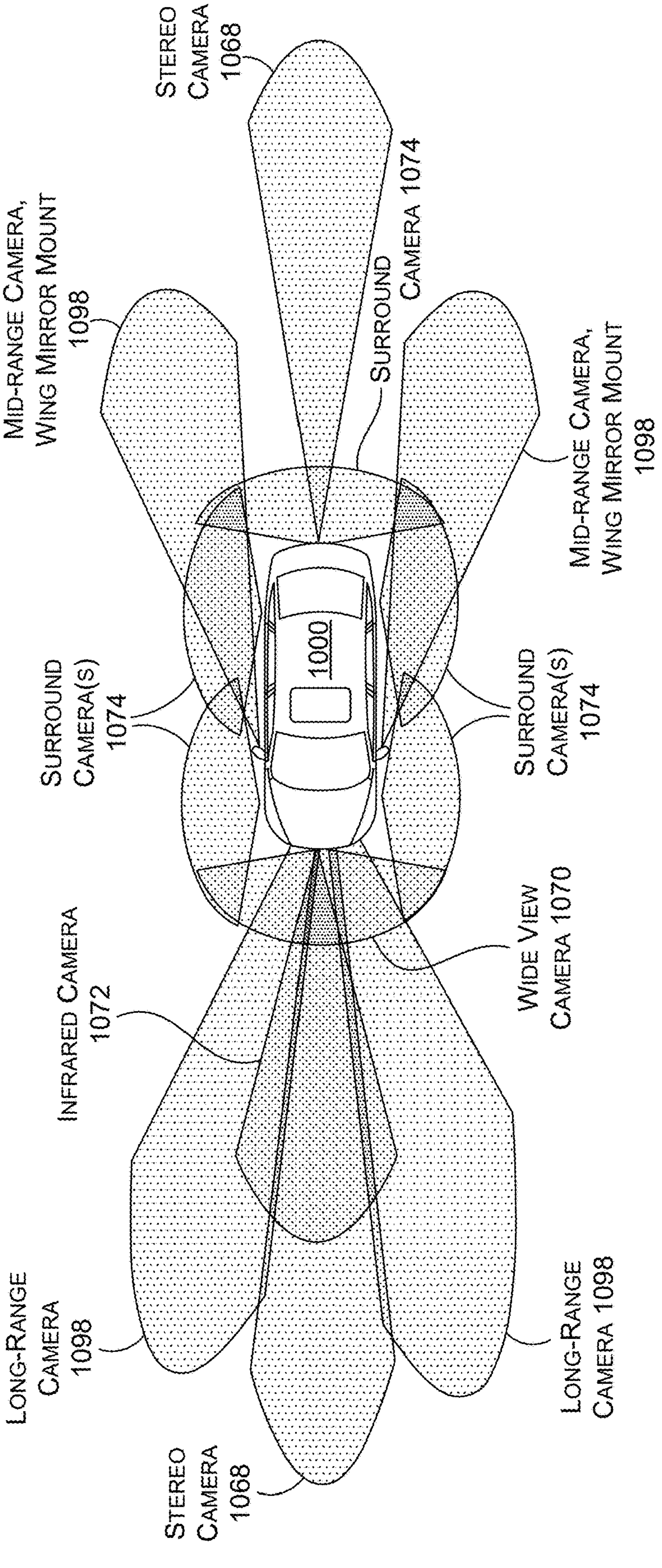
FIG. 10B is an example of camera locations and fields of view for the example autonomous vehicle of FIG. 10A, in accordance with some embodiments of the present disclosure.
Figure 10C:
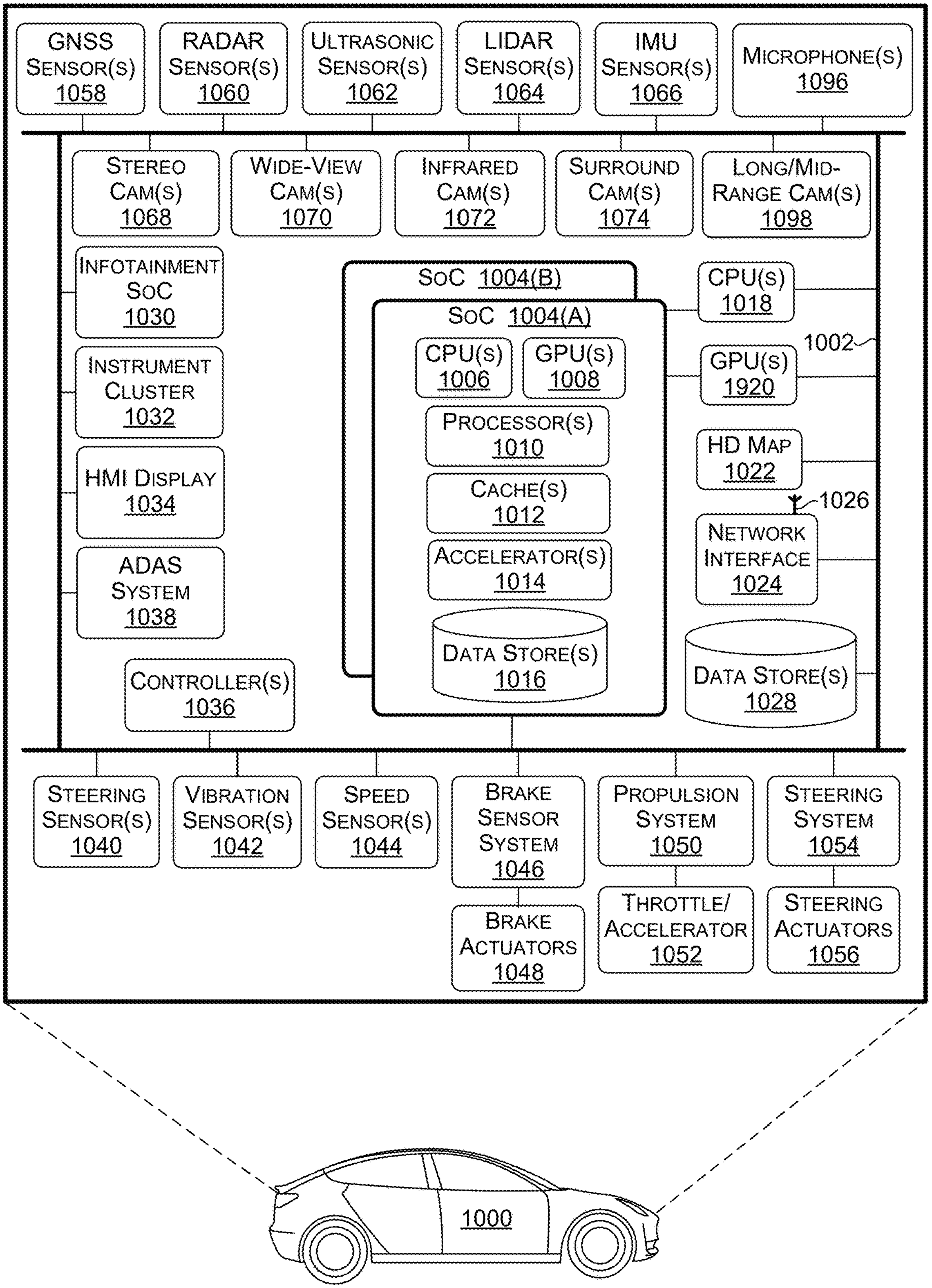
FIG. 10C is a block diagram of an example system architecture for the example autonomous vehicle of FIG. 10A, in accordance with some embodiments of the present disclosure.
Figure 10D:
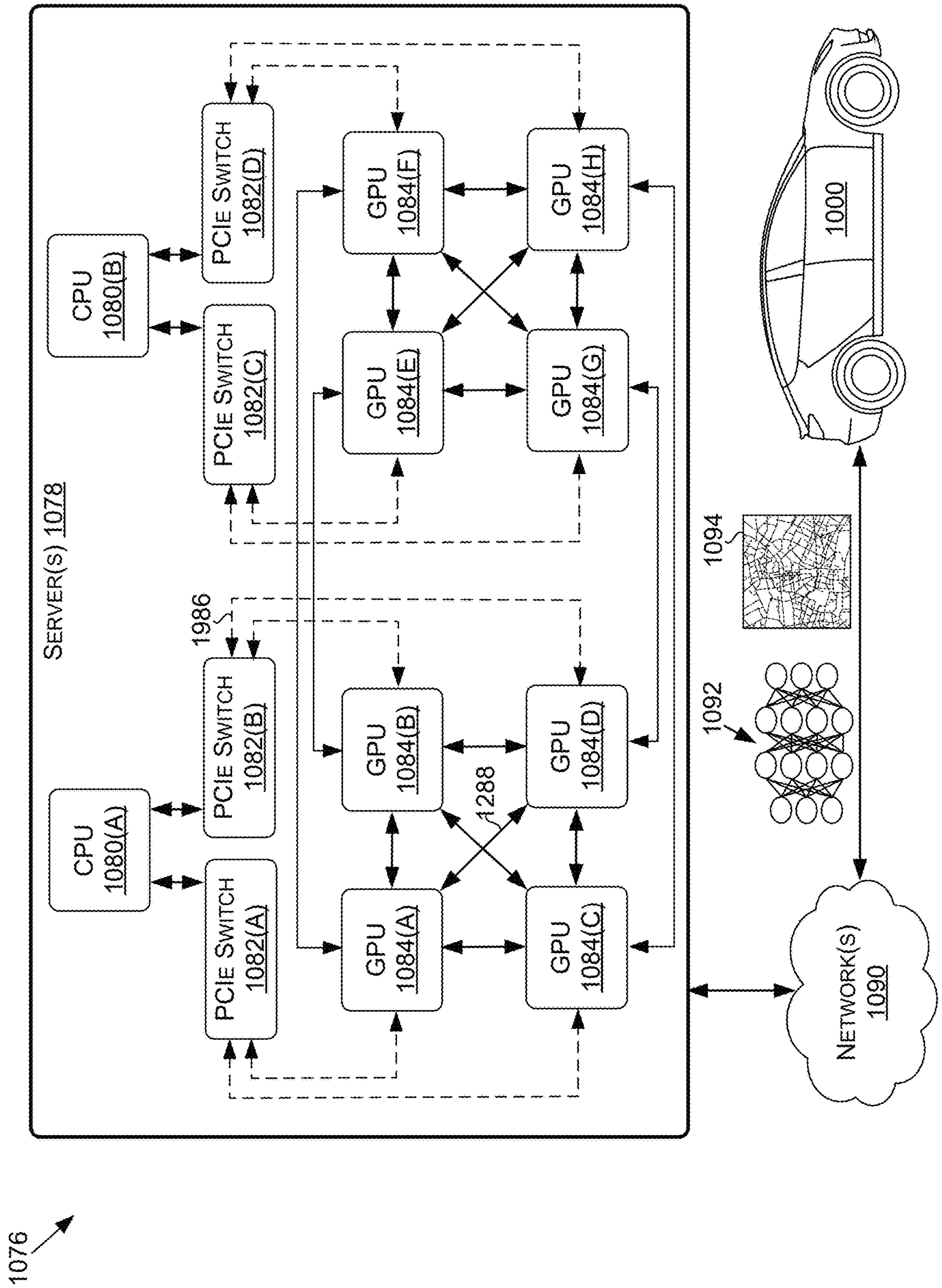
FIG. 10D is a system diagram for communication between cloud-based server(s) and the example autonomous vehicle of FIG. 10A, in accordance with some embodiments of the present disclosure.

In some examples, information from the map perceiver may be sent, transmitted, and/or provided to server(s) (e.g., to a map manager of server(s) 1078 of FIG. 10D), and information from the server(s) may be sent, transmitted, and/or provided to the map perceiver and/or a localization manager of the vehicle 1000. The map manager may include a cloud mapping application that is remotely located from the vehicle 1000 and accessible by the vehicle 1000 over one or more network(s). For example, the map perceiver and/or the localization manager of the vehicle 1000 may communicate with the map manager and/or one or more other components or features of the server(s) to inform the map perceiver and/or the localization manager of past and present drives or trips of the vehicle 1000, as well as past and present drives or trips of other vehicles. The map manager may provide mapping outputs (e.g., map data) that may be localized by the localization manager based on a particular location of the vehicle 1000, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manager, among other information, to generate a planned path that may consist of GNSS waypoints (e.g., GPS waypoints), 3D world coordinates (e.g., Cartesian, polar, etc.) that indicate coordinates relative to an origin point on the vehicle 1000, etc. The waypoints may be representative of a specific distance into the future for the vehicle 1000, such as a number of city blocks, a number of kilometers, a number of feet, a number of inches, a number of miles, etc., that may be used as a target for the lane planner.

The lane planner may use the lane graph, object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1000, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on a detected lane graph(s) of the planning component(s) 128 as closely as possible and within the capabilities of the vehicle 1000. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1000 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1000. In some examples, the obstacle avoidance component(s) 132 may be used independently of components, features, and/or functionality of the vehicle 1000 that is required to obey traffic rules and drive courteously. In such examples, the obstacle avoidance component(s) may ignore traffic laws, rules of the road, and courteous driving norms in order to ensure that collisions do not occur between the vehicle 1000 and any objects. As such, the obstacle avoidance layer may be a separate layer from the rules of the road layer, and the obstacle avoidance layer may ensure that the vehicle 1000 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable or other navigable paths and/or the detected lane graphs(s) 115 may be used by the obstacle avoidance component(s) 132 in determining controls or actions to take. For example, the drivable paths may provide an indication to the obstacle avoidance component(s) 132 of where the vehicle 1000 may maneuver without striking any objects, protuberances, structures, and/or the like, or at least where no static structures may exist.

In non-limiting embodiments, the obstacle avoidance component(s) 132 may be implemented as a separate, discrete feature of the vehicle 1000. For example, the obstacle avoidance component(s) 132 may operate separately (e.g., in parallel with, prior to, and/or after) the planning layer, the control layer, the actuation layer, and/or other layers of the drive stack 122.

As such, the vehicle 1000 may use this information (e.g., as the edges, or rails of the paths) to navigate, plan, or otherwise perform one or more operations (e.g. lane keeping, lane changing, merging, splitting, etc.) within the environment.

Figure 7:
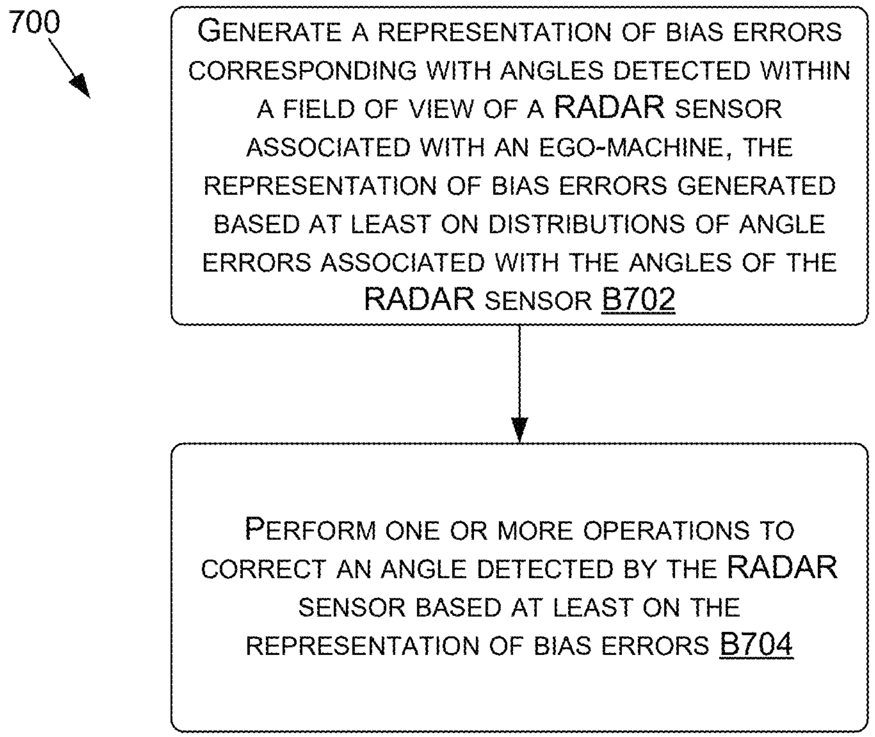
FIGS. 7-9 provides example methods for identifying and correcting bias error, in accordance with some embodiments of the present disclosure.
Figure 8:
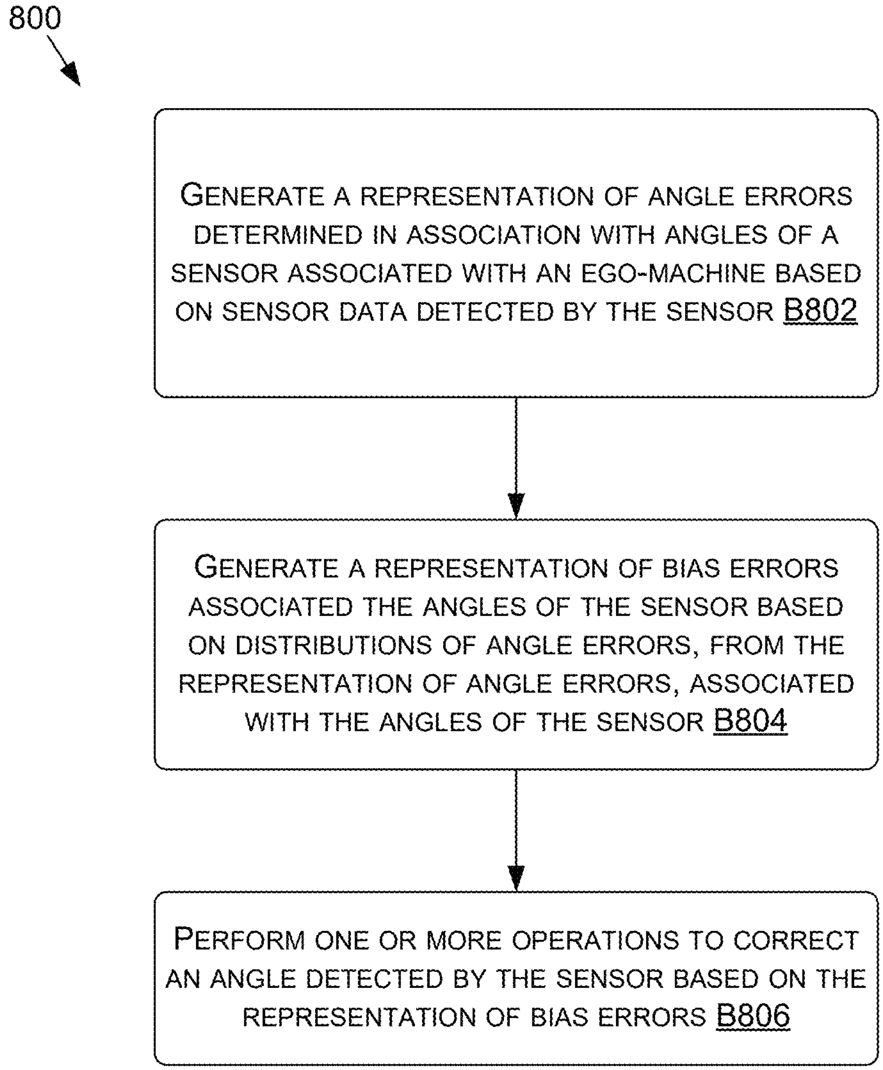
Figure 9:
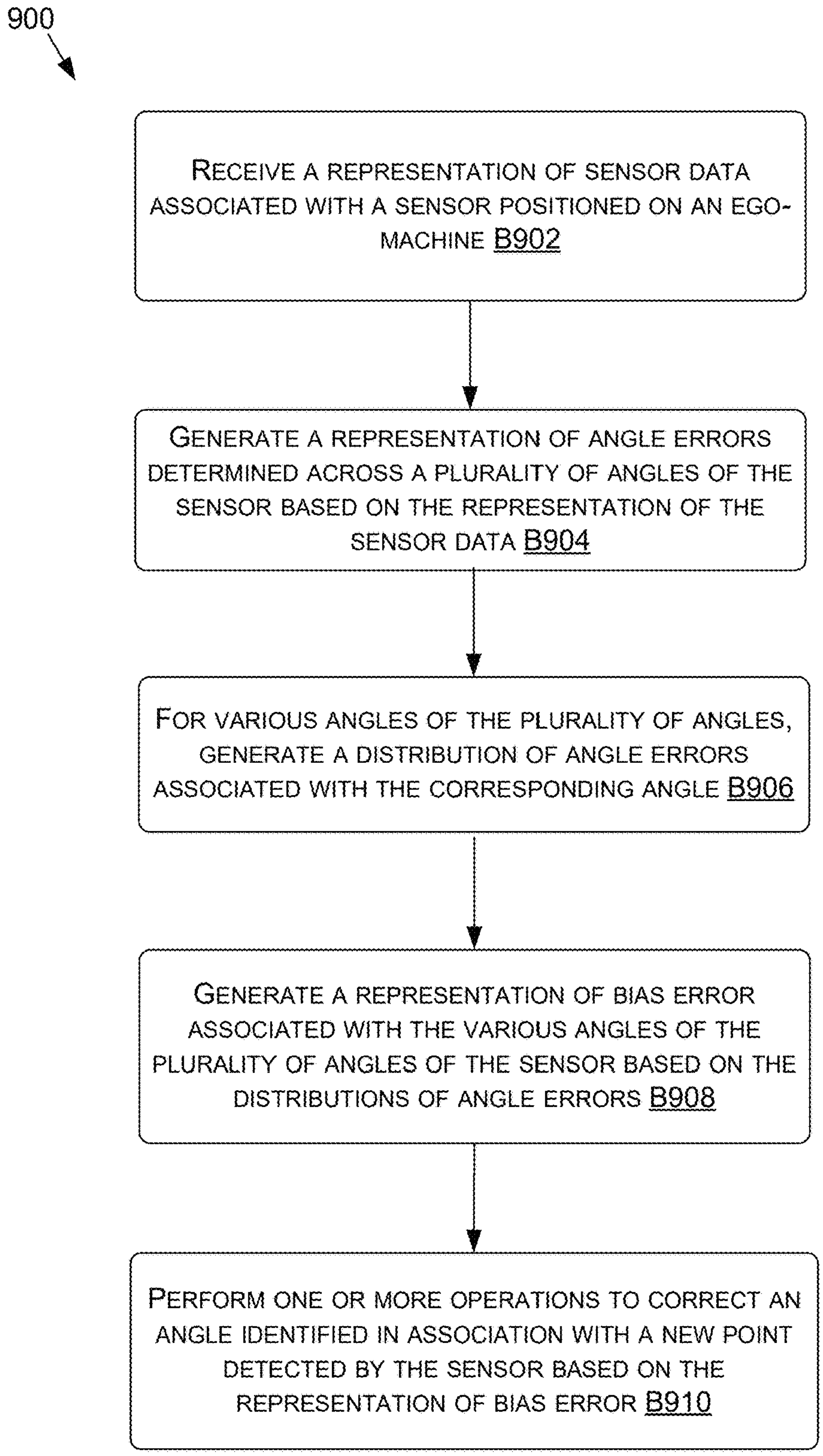

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 700, 800, and 900 may be described, by way of example, with respect to the error bias identification and correction system of FIG. 1. However, these methods may additionally or alternatively be executed by any one system, or any combination of systems, including, but not limited to, those described herein.

FIG. 7 is a flow diagram showing a method 700 for identifying and correcting bias error, in accordance with some embodiments of the present disclosure. The method 700, at block B702, includes generating a representation of bias errors corresponding with angles detected within a field of view of a RADAR sensor positioned on an ego-machine, the representation of bias errors generated based on distribution of angle errors associated with the angles of the RADAR sensor. In embodiments, the representation of bias errors includes an angle bias error for corresponding angles associated with the RADAR sensor. In this way, for various angles associated with a RADAR sensor, a corresponding angle bias error may be represented. In some cases, an angle bias error for a particular angle may be represented using a mean of angle errors for the particular angle. Additionally or alternatively, the angle bias error for a particular angle may be represented using an uncertainty range associated with the mean of the angle errors for the particular angle. In some embodiments, to determine an angle bias error for a particular angle, or angle range (e.g., two degrees), a distribution may be generated and used. For example, a distribution may be generated for angle errors corresponding with an angle between zero degrees and two degrees.

The method 700, at block B704, includes performing one or more operations to correct an angle detected by the RADAR sensor based on the representation of bias errors. In this regard, upon generating a representation of bias errors corresponding with various angles, the representation of bias errors may be used to identify an error value for use in correcting a detected angle. For example, assume a new point is detected to be positioned at a 30 degree angle from a RADAR sensor. Based on the an angle bias error at 30 degrees being identified as 0.5, the new angle of 29.5 may be determined and used for performing subsequent analysis.

FIG. 8 is a flow diagram showing a method 800 for identifying and correcting bias error, in accordance with some embodiments of the present disclosure. The method 800, at block B802, includes generating a representation of angle errors determined in association with angles of a sensor associated with an ego-machine based on sensor data detected by the sensor. In embodiments, angle errors may be determined by performing numerical minimization. In some implementations, such a sensor is a RADAR sensor that is positioned on the ego-machine to detect sensor data.

The method 800, at block B804, includes generating a representation of bias errors associated with angles of the sensor based on distributions of angle errors, from the representation of angle errors, associated with the angles of the sensor. In this regard, for various angles of the sensor, distributions of corresponding angle errors may be generated. For example, for a particular degree or range of degrees (e.g., two degrees), angle errors associated with the corresponding angle(s) may be used to generate a distribution. Such distributions may then be used to generate the representation of bias errors associated with the angles. In some cases, a bias error associated with a particular degree or range of degrees may be represented using a mean angle bias error for the corresponding angle.

The method 800, at block B806, includes performing one or more operations to correct an angle detected by the sensor based on the representation of bias errors. In this regard, an angle associated with a newly detected point may be adjusted to account for the error bias associated with the detected angle.

FIG. 9 is a flow diagram showing a method 900 for identifying and correcting bias error, in accordance with some embodiments of the present disclosure. The method 900, at block B902, includes receiving a representation of sensor data associated with a sensor positioned on an ego-machine. In embodiments, sensor data includes angle data, distance data, velocity data, Doppler effect data, Doppler velocity data, or a combination thereof. The sensor data may be received in the form of a point cloud including a collection of points generated based on data detected by the sensor.

The method 900, at block B904, includes generating a representation of angle errors determined across a plurality of angles of the sensor based on the representation of the sensor data. To determine angle errors, in some cases, stationary points may be analyzed. In this way, stationary points that correspond with objects that are stationary may be identified via the sensor data. Thereafter, angle errors associated with such stationary points may be determined. In some cases, numerical minimization may be performed to determine angle errors across angles of the sensor. Any number of points may be used to perform numerical minimization. For instance, in some embodiments, three unknown errors may be included in the equations for performing numerical minimization. As such, at least three data points detected by the sensor may be used to determine angle errors in an efficient and effective manner.

The method 900, at block B906, includes generating, for various angles of the plurality of angles, a distribution of angle errors associated with the corresponding angle. For example, for a first angle or angle range, a first distribution of corresponding angle errors may be generated, and for a second angle or angle range, a second distribution of corresponding angle errors may be generated.

The method 900, at block B908, includes generating a representation of bias error associated with the various angles of the plurality of angles of the sensor based on the distributions of angle errors. In some embodiments, the representation of bias error may be generated using means of angle errors associated with the distributions. For example, continuing with the above example, a first mean associated with the first distribution may be used to represent the bias error for the first angle or angle range, and a second mean associated with the second distribution may be used to represent the bias error for the second angle or angle range.

The method 900, at block B910, includes performing one or more operations to correct an angle identified in association with a new point detected by the sensor based on the representation of the bias error. In one embodiment, a subsequent sensor data generated using the sensor may be received and an angle associated therewith may be identified. Based on the representation of bias error associated with the angle, the angle may be adjusted to offset for the angle bias error.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

FIG. 10 is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the High Definition ("HD") map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1022 which may use one or more wireless antenna(s) 1026 and/or modem(s) to communicate over one or more networks. For example, the network interface 1022 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 190 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1022 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 1004 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environment and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1022 which may include one or more wireless antennas 1026 (e.g., one or more wireless antennas for different communication protocols, such as a cellular antenna, a Bluetooth antenna, etc.). The network interface 1022 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1022 may include a SoC that provides modulation and demodulation functionality and enables the controller(s) 1036 to communicate over wireless networks. The network interface 1022 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1200 m, with an accuracy of 2 cm-3 cm, and with support for a 1200 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines microelectro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1022 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
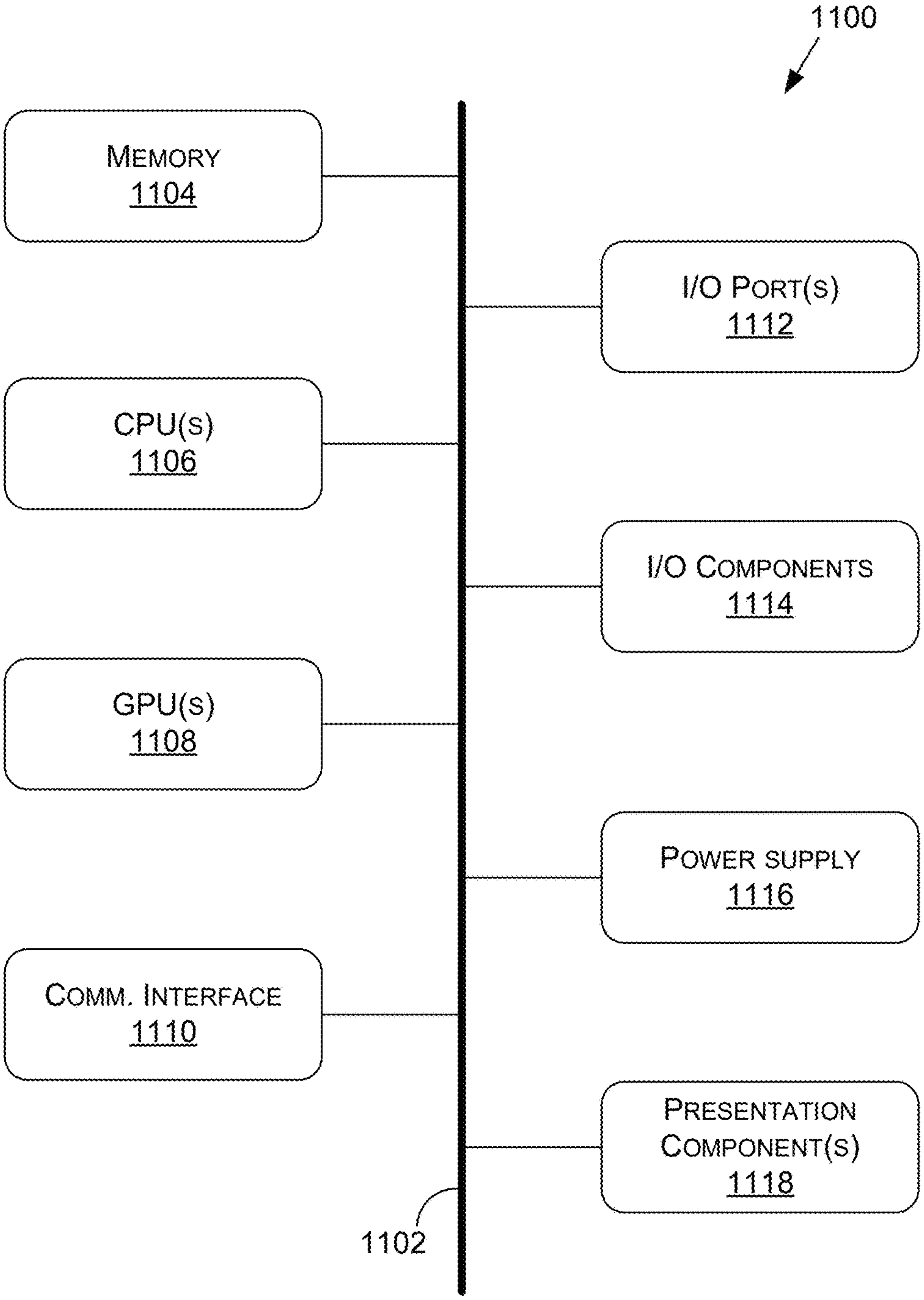
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1010, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1004 may be representative of a storage device in addition to the memory of the GPUs 1108, the CPUs 1106, and/or other components). In other words, the computing device of FIG. 11 is merely illustrative. Distinction is not made between such categories as “workstation,” “server,” “laptop,” “desktop,” “tablet,” “client device,” “mobile device,” “hand-held device,” “game console,” “electronic control unit (ECU),” “virtual reality system,” and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1000.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term “modulated data signal” may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1008 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
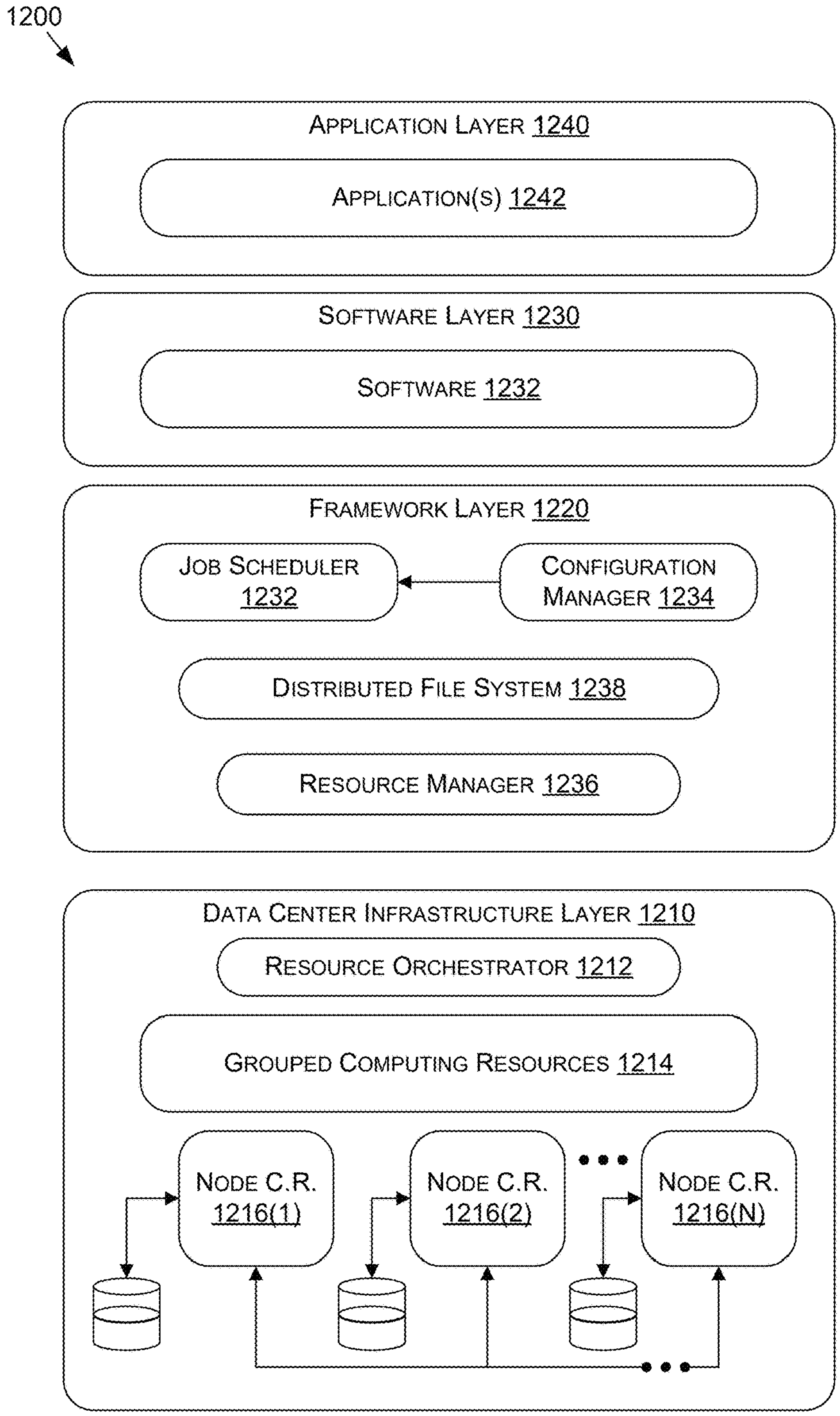
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161 (N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

obtaining sensor data generated using a sensor associated with an ego-machine;

generating a representation of angle errors determined across a plurality of angles of the sensor based at least on a representation of the sensor data;

generating a representation of bias error associated with a first angle of the plurality of angles of the sensor based at least on a first distribution of angle errors, from the representation of angle errors, associated with the first angle of the plurality of angles of the sensor and a second angle of the plurality of angles of the sensor based at least on a second distribution of angle errors, from the representation of angle errors, associated with the second angle of the plurality of angles of the sensor; and performing one or more correction operations on one or more subsequent angles, identified in association with subsequent sensor data generated using the sensor, based at least on the representation of bias error associated with the first angle and the second angle.

2. The method of claim 1, wherein the sensor data comprises at least one of angle data, distance data, velocity data, Doppler effect data, or Doppler velocity data.

3. The method of claim 1, wherein the sensor data is received in a form of a point cloud including a collection of points generated based at least on data detected using the sensor.

4. The method of claim 1 further comprising determining angle errors across the plurality of angles of the sensor based at least on one or more stationary points.

5. The method of claim 1 further comprising:

identifying, using the sensor data, one or more stationary points that correspond with one or more objects that are stationary; and determining angle errors across the plurality of angles of the sensor based at least on the one or more stationary points.

6. The method of claim 1, further comprising determining angle errors across the plurality of angles of the sensor based at least on performing numerical minimization.

7. The method of claim 1, wherein determining an angle error for the representation of angle errors comprises performing numerical minimization in accordance with at least a portion of the sensor data associated with at least three data points detected using the sensor.

8. The method of claim 1, further comprising:

generating the first distribution of angle errors associated with the first angle of the plurality of angles of the sensor; and identifying a mean of the angle errors associated with the first angle based at least on the first distribution of angle errors.

9. The method of claim 1, wherein the representation of bias error is generated using a first mean of first angle errors associated with the first angle based at least on the first distribution of angle errors and a second mean of second angle errors associated with the second angle based at least on the second distribution of angle errors.

10. The method of claim 1, wherein the representation of bias error includes an angle bias error for each angle of the plurality of angles of the sensor.

11. The method of claim 1, wherein the representation of bias error includes an angle bias error for angles of the plurality of angles of the sensor, and wherein each angle bias error indicates a mean angle bias error for a corresponding angle and an uncertainty range associated with the mean angle bias error for the corresponding angle.

12. The method of claim 1 further comprising:
obtaining the subsequent sensor data generated using the sensor;
identifying the one or more subsequent angles associated with the subsequent sensor data; and
adjusting at least one angle of the one or more subsequent angles based at least on the representation of bias error to offset for angle bias error.

13. The method of claim 1, wherein the method is performed using at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system implementing one or more visual language models (VLMs);
a system for generating synthetic data;
a system for generating synthetic data using AI;
a system incorporating one or more virtual machines (VMs);
a system implemented at least partially in a data center; or
a system implemented at least partially using cloud computing resources.

14. One or more processors comprising processing circuitry to:
generate a representation of bias errors corresponding with a first angle and a second angle detected within a field of view of a RADAR sensor associated with an ego-machine, the representation of bias errors generated based at least on a first distribution of angle errors associated with the first angle and a second distribution of angle errors associated with the second angle of the RADAR sensor; and
perform one or more operations to correct an angle detected using the RADAR sensor based at least on the representation of bias errors.

15. The one or more processors of claim 14, wherein the representation of bias errors includes an angle bias error for the first angle indicating a mean angle bias error for the first angle and an uncertainty range associated with the mean angle bias error for the first angle.

16. The one or more processors of claim 14, wherein the one or more processors are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system implementing one or more visual language models (VLMs);
a system for generating synthetic data;
a system for generating synthetic data using AI;
a system incorporating one or more virtual machines (VMs);
a system implemented at least partially in a data center; or
a system implemented at least partially using cloud computing resources.

17. A system comprising one or more processors to:
generate a representation of angle errors determined in association with angles of a sensor associated with an ego-machine based at least on sensor data detected using the sensor;
generate a representation of bias errors associated with a first angle of the sensor based at least on a first distribution of angle errors, from the representation of angle errors, associated with the first angle of the sensor and a second angle of the sensor based at least on a second distribution of angle errors, from the representation of angle errors, associated with the second angle of the sensor; and
perform one or more operations to correct an angle detected by the sensor based at least on the representation of bias errors.

18. The system of claim 17, wherein angle errors of the representation of angle errors are determined based at least on performing numerical minimization using at least a portion of the sensor data detected using the sensor.

19. The system of claim 17, wherein the one or more processors are further to determine angle errors of the representation of angle errors across the angles of the sensor based at least on one or more stationary points.

20. The system of claim 17, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;

a system implementing one or more language models;

a system implementing one or more large language models (LLMs);

a system implementing one or more visual language models (VLMs);

a system for generating synthetic data;

a system for generating synthetic data using AI;

a system incorporating one or more virtual machines (VMs);

a system implemented at least partially in a data center; or a system implemented at least partially using cloud computing resources.

* * * * *